US 6,707,995 B1

(12) United States Patent
Ichikawa et al.

(10) Patent No.: US 6,707,995 B1
(45) Date of Patent: Mar. 16, 2004

(54) CAMERA HAVING CONTROL DEVICE FOR FLASH PHOTOGRAPHY AND ITS CONTROL METHOD

(75) Inventors: Tsutomu Ichikawa, Sakai (JP); Norihiko Akamatsu, Suita (JP); Motoshi Yamaguchi, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/392,946

(22) Filed: Mar. 21, 2003

(30) Foreign Application Priority Data

Sep. 18, 2002 (JP) ........................................ 2002-271783

(51) Int. Cl.[7] .............................................. G03B 15/05
(52) U.S. Cl. ........................ 396/100; 396/121; 396/157; 396/159
(58) Field of Search ................................ 396/100, 157, 396/121–123, 159–163

(56) References Cited

U.S. PATENT DOCUMENTS

| 4,760,418 A | | 7/1988 | Ishizaki et al. ............. 396/100 |
| 4,943,824 A | * | 7/1990 | Nabeshima et al. .......... 396/50 |
| 5,752,101 A | | 5/1998 | Akamatsu et al. .......... 396/155 |
| 6,240,252 B1 | * | 5/2001 | Yamaguchi et al. .......... 396/61 |
| 6,240,253 B1 | * | 5/2001 | Yamaguchi et al. .......... 396/61 |

FOREIGN PATENT DOCUMENTS

| JP | 8-248468 | 9/1996 | ............ G03B/7/16 |
| JP | 11-190871 | 7/1999 | ............ G03B/15/05 |

* cited by examiner

Primary Examiner—W. B. Perkey
(74) Attorney, Agent, or Firm—McDermott, Will & Emery

(57) ABSTRACT

A photographing apparatus with a simple mechanism in which an AF sensor is employed as a light adjusting sensor. The apparatus includes a multi-AF sensor having a plurality of detecting areas for receiving light passing through a photographing lens, an AF controller for determining a focus area based upon signals outputted from the multi-AF sensor, and a light emitter for projecting light towards an object to be photographed. Prior to a main flash emission, the light emitter emits light preliminarily. On the basis of signals which are outputted from the detecting areas of the multi-AF sensor and which correspond to a reflected light from the object at time of emitting the preliminary flash light, a suitable area which outputs a suitable signal for photography is selected. On the basis of the signal of the suitable area thus selected, the amount of light of the main flash emission is determined.

18 Claims, 27 Drawing Sheets

Fig. 15

S100 PROCESS FOR DETERMINING WHETHER OVERFLOW OCCURS OR NOT

S101
Nnov=0
NOV[1]=FFh
NOV[2]=FFh
NOV[3]=FFh
NOV[4]=FFh

S102 Tf(1)=Tref?
YES → S103 Nnov=Nnov+1, NOV[1]=0
NO ↓

S104 Tf(2)=Tref?
YES → S105 NOV[2]=0
NO ↓

S106 Tf(3)=Tref?
YES → S107 Nnov=Nnov+1, NOV[3]=0
NO ↓

S108 Tf(4)=Tref?
YES → S109 NOV[4]=0
NO ↓

S110 Tf(2)=Tref or Tf(4)=Tref?
YES → S111 Nnov=Nnov+1
NO ↓

END

CAMERA HAVING CONTROL DEVICE FOR FLASH PHOTOGRAPHY AND ITS CONTROL METHOD

This application is based on application No. 2002-271783 filed in Japan, the contents of which are hereby incorporated by reference.

BACKGROUND OF THE INVENTION

1. Field of the Invention

The present invention generally relates to a camera, such as a single-lens reflex camera employing a film and a single-lens reflex type of digital camera, having a control device for controlling flash photography in which there is provided a TTL (i.e. Through The Lens) focus detection device, and to a method for controlling the flash photography, and particularly relates to the camera which emits a preliminary flash light and controls the amount of emission of a main flash light on the basis of information obtained from the emission of the preliminary flash light, and to the method for controlling the flash photography.

2. Description of the Related Arts

As a method for controlling the amount of flash light emission of a camera, conventionally, there have been proposed a method of flashmatic control for controlling the amount of flash light emission, on the basis of a distance between the camera and an object (or subject) to be photographed and on the basis of the setup amount of aperture thereof, and a method of TTL direct light adjustment control for measuring the amount of light reflected from the surface of a film while exposing the film to light and for stopping the exposure of the film thereto when the amount of the light reaches a predetermined one thereof, or the like.

For example, U.S. Pat. No. 4760418 discloses a technique that the flux of light (i.e. beam of light or luminous flux) is measured by a focus detection sensor at time of flash light emission, and that the amount of the flash light emission is adjusted by detecting the output of the light amount integration (or integral) of the sensor. In the technique, the light reflected on the film surface is led to the sensor at time of the exposure of a film to light, and the flash light emission is stopped when the amount of the flash light emission reaches a predetermined one, by the TTL direct light adjustment control.

According to the technique, a focus detection sensor (hereinafter, also referred to as an "AF sensor") which is employed for detecting focus condition is also employed as a light adjustment sensor for detecting the light which is reflected from the object (or subject) to be photographed. In other words, the operation of the light adjustment and that of the focus-detection, are performed by a single sensor. That is, not only the arrangement makes it possible to save a space for arranging the light adjustment sensor so that the camera is downsized, but also the lower cost of the camera is achieved by omitting the light adjustment sensor.

According to the technique, at the stage of performing the operation of the auto-focus, the light of the object to be photographed is reflected on the mirror, and the light thus reflected thereon can be led to the AF sensor. However, at the stage of photographing the object, it is necessary to retreat the mirror; namely, it is not possible to employ the mirror. Therefore, a particular means for leading, or guiding, the light of the object reflected on the film surface towards the AF sensor, is required (refer to FIGS. 1 and 2 in the same publication). That is, such an additional means complicates the mechanism around the mirror, and increases the number of parts constituting the whole mechanism. As a result, the size and cost of the camera increase.

Additionally, generally, the range from maximum to minimum signal levels that the monitor of the AF sensor can integrate is narrow so that it is difficult to employ the AF sensor also as the light adjustment sensor. That is, according to the arrangement, when the flash light emission is made, the output from the sensor is overflown because the amount of the reflected light is excessive, if the reflectance of an object to be photographed is greater and/or if the distance between the object and the camera is smaller. Or, sufficient output from the sensor can not be obtained since the amount of the reflected light is small, if the reflectance of an object to be photographed is smaller and/or if the distance between the object and the camera is greater. Namely, in each case, it is not possible to perform the light adjustment control with a high precision.

On the other hand, in a case that a light receiving element or component with a high performance, as an AF sensor, which has a wider range from maximum to minimum signal levels that the sensor can integrate, is employed, the cost of the camera having the mechanism is up.

SUMMARY OF THE INVENTION

Therefore, it is an object of the present invention to provide a low-cost camera having a simple mechanism, in which an AF sensor functions as a light adjustment sensor.

It is another object of the present invention to provide a method for controlling flash photography employed by the camera.

In accomplishing these and other objects of the present invention, according to one aspect thereof, there is provided a camera comprising: a multi-AF sensor having a plurality of detection areas for receiving a reflected light, passing through a photographing lens, from an object to be photographed, in which each of the detection areas outputs a signal; an AF controller for determining a detection area of the detection areas as a focus area on a basis of the signal outputted from the each of the detection areas of the multi-AF sensor; a selector for selecting a detection area of the detection areas as an optimum area which is most suitable for photographing the object, on a basis of the signal outputted from the each of the detection areas of the multi-AF sensor, in which the signal outputted from the each thereof corresponds to the reflected light from the object on a basis of a preliminary flash light emission made by a flash emitter prior to a main flash light emission made by the flash emitter; and a controller for determining an amount of flash light emission made by the flash emitter at time of the main flash light emission, on a basis of the signal outputted from the optimum area selected by the selector.

That is, according to the arrangement, the preliminary flash light is emitted firstly, and then the main flash light is emitted for exposure. In other words, by employing the AF sensor as the light adjustment sensor, it is possible to cancel a member for securing an optical path for guiding the light from the object to be photographed. Namely, with the arrangement, there is no need of a separate light adjustment sensor, thus realizing a low-cost camera having a simple mechanism.

Also, according to the arrangement, when the brightness of part of the object is high, and when the brightness thereof is beyond a certain limit within which the multi-AF sensor can integrate electrical charges, such a situation as it is impossible to control the light adjustment is avoided, and the amount of the main light emission is determined by selecting a particular area of the detection areas which outputs a suitable signal. That is, the range from maximum to minimum signal levels that the multi-AF sensor can integrate, is expanded substantially, by separately processing each of the signals having different values which are outputted from the plurality of the detection areas locating in a focussing area, so that the amount of the main flash light emission can be calculated.

In the arrangement, in a case that the camera is of a type of single-lens reflex digital camera, it is possible to execute a TTL (through-the-lens (metering)) light adjustment even if the image sensor, of the camera, for photographing an object, does not have a flash light monitoring function.

BRIEF DESCRIPTION OF THE DRAWINGS

These and other objects and features of the present invention will become clear from the following description taken in conjunction with the preferred embodiment thereof with reference to the accompanying drawings.

FIG. 15 is a flow chart showing a detailed process for determining whether there is an overflow of output occurs or not.

DETAILED DESCRIPTION OF THE PREFERRED EMBODIMENT

Figure 1:
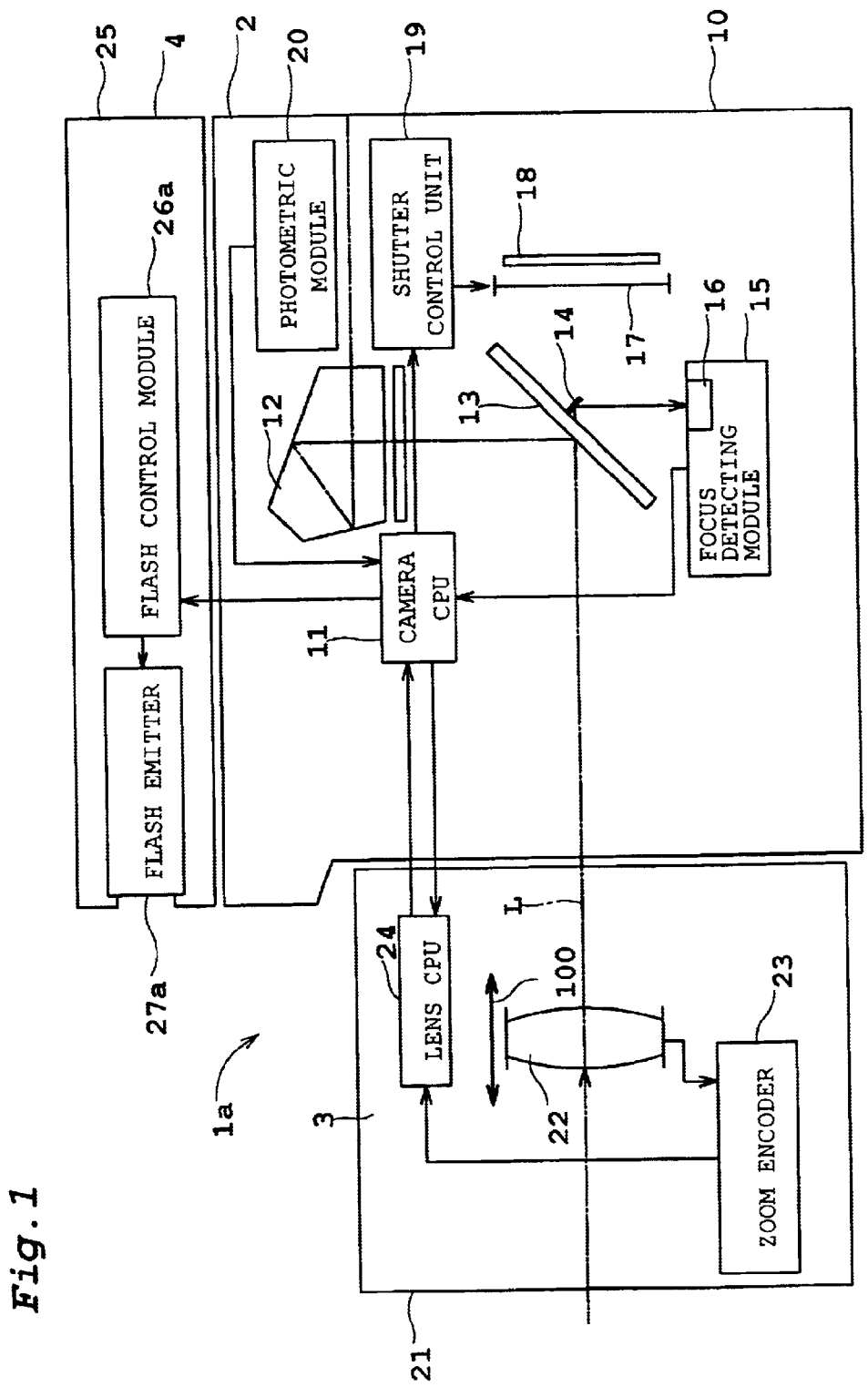
FIG. 1 is a view showing a general construction of a camera, showing one state of a preferred embodiment of the present invention, which has a control device for controlling flash photography, in which an external flash device is attached.

Before a description of a preferred embodiment of the present invention proceeds, it is to be noted that like or corresponding parts are designated by like reference numerals throughout the accompanying drawings.

Referring to FIGS. 1 through 26, the description is made below upon a camera 1 (1a, 1b) which has a control device for controlling flash photography, according to the preferred embodiment thereof.

Figure 2:
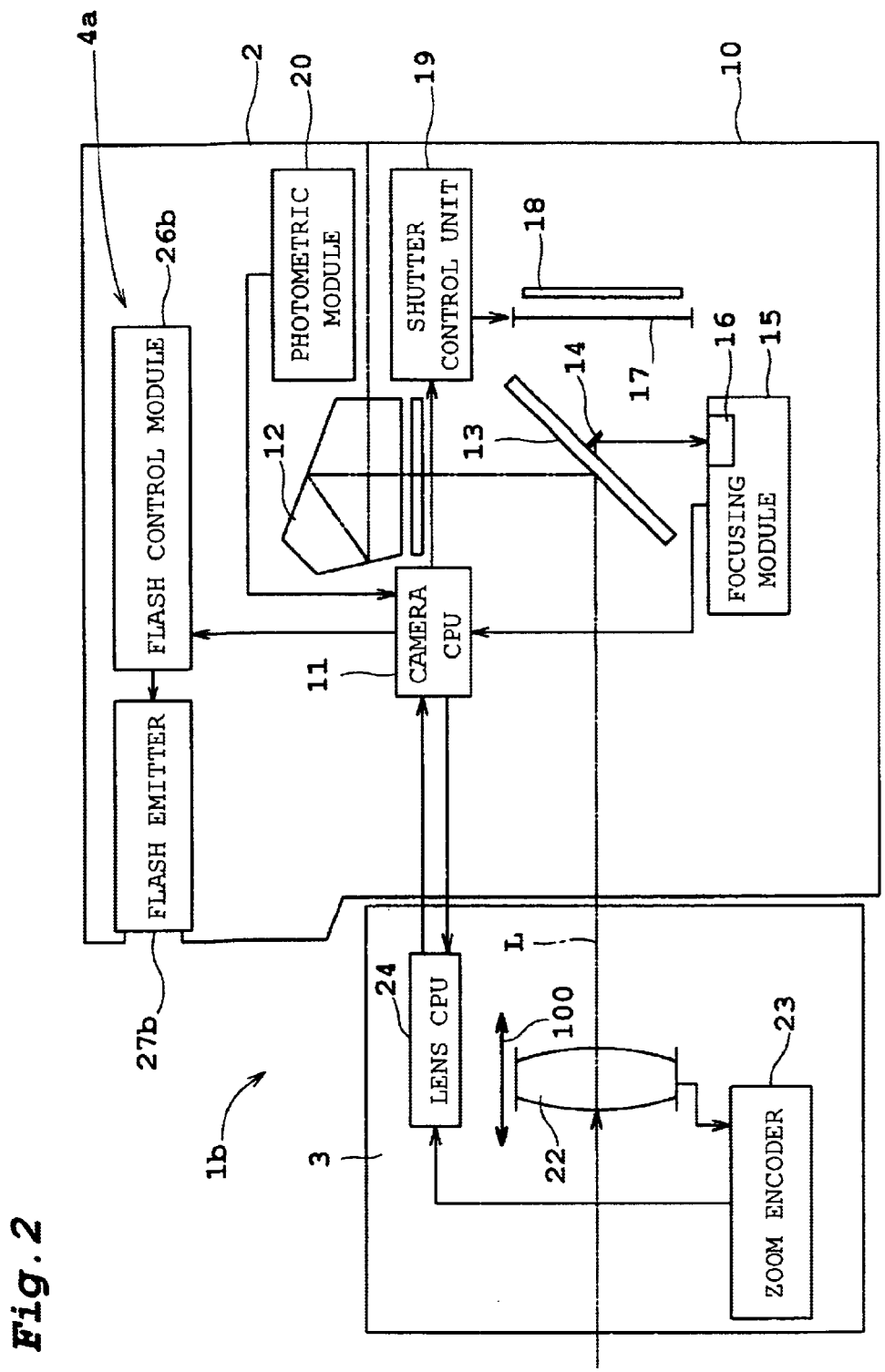
FIG. 2 is a view showing the general construction of the camera, showing another state of the preferred embodiment of the present invention, which has the control device for controlling the flash photography, in which a built-in flash device is used.

FIG. 1 is a constructional view of the camera 1a, showing one state of the embodiment, which uses an external flash device 4 detachably attached to a camera body 2, and FIG. 2 is a constructional view of the camera 1b, showing another state of the embodiment, which uses a built-in flash device 4a installed in the camera body 2.

The camera 1 (1a, 1b) is a single-lens reflex camera using a film, in which both of a taking lens 3 and the external flash device 4 are detachably connected to the camera body 2. The external flash device 4 includes an external flash emitter 27a, and includes a flash control module 26a for controlling the amount (i.e. guide number level) of light emission of the external flash emitter 27a and for controlling the timing of the flash emission. When the external flash device 4 is attached to the camera body 2, the buit-in flash device 4a is not used. As a modification, the camera can be constructed as one having no built-in flash device and using the external flash device only.

As shown in FIG. 2, the camera body 2 includes the built-in flash device 4a which has a built-in flash emitter 27b and the flash control module 26b which are used for flash photography.

Figure 3:
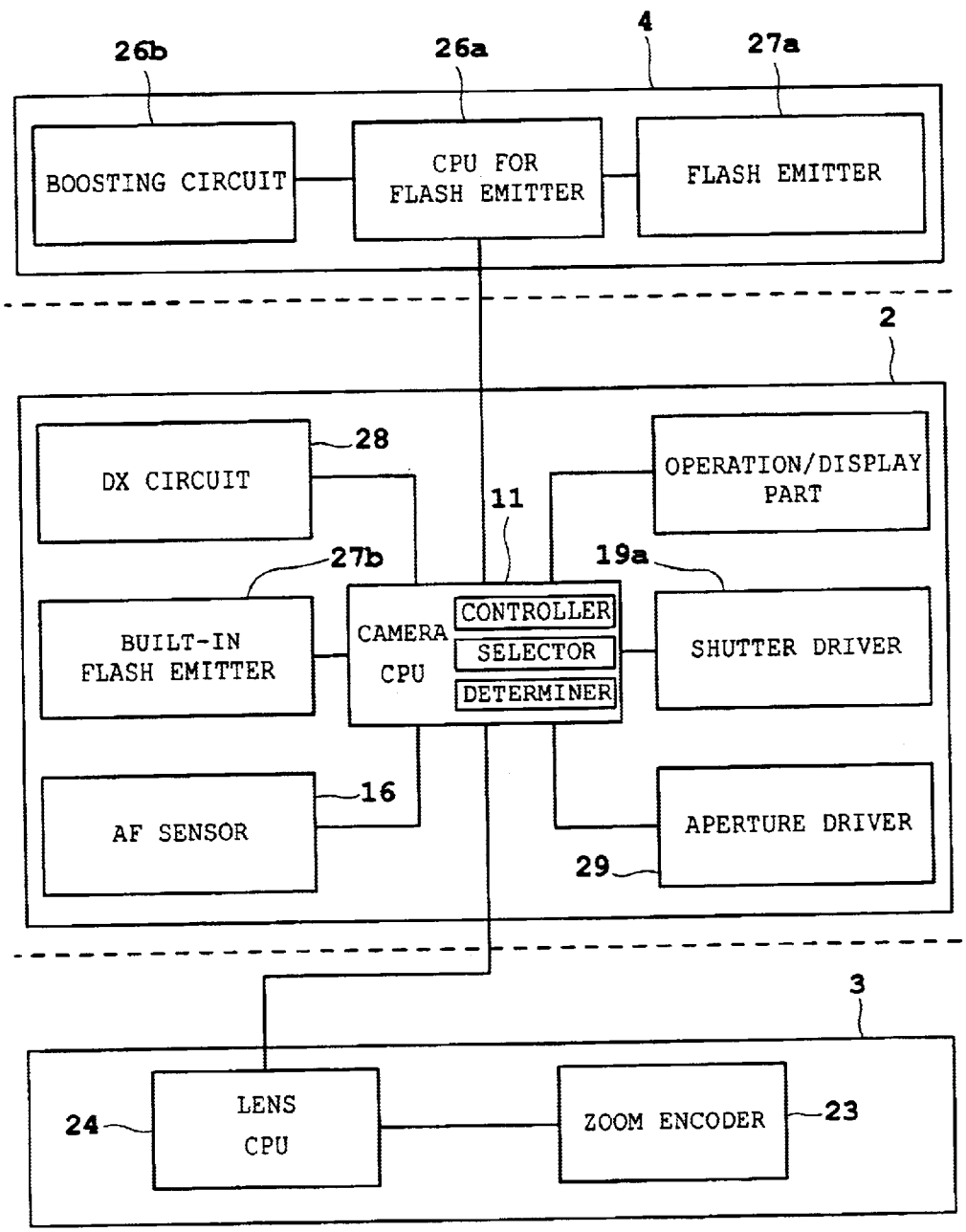
FIG. 3 is a block diagram showing a general construction including the control device employed in the camera of FIGS. 1 and 2.

FIG. 3 is a block diagram showing a general construction, or mechanism, including a control device, of the camera 1 (1a, 1b) shown in FIGS. 1 and 2. As shown in the figures, there is mounted a CPU (or camera CPU) 11 having a micro-computer, functioning as a controller/AF controller, a selector and a determiner (or determinator), for example, in the camera body 2 of the camera 1. The CPU 11 cooperates with a lens CPU 24 as described later, and thereby the CPU 11 centrally controls the photographing operation of the camera such as a focus adjustment, light adjustment in the flash device, shutter operation (or releasing operation), aperture operation, etc.

The camera 1 has a function of the light emission control which is performed on the basis of a flashmatic control for controlling the amount of light emission of the flash device and on the basis of a light adjustment control employing preliminary light emission for calculating emission amount (guide number) of the main flash emission based on the monitoring output in a case of emitting the flash light preliminarily, and the camera 1 has an auto-focus function with TTL focus detection. Namely, the camera CPU 11 performs the control for calculating the amount of light emission by the flash device 4, 4a on the basis of the flashmatic control and the light adjustment control employing preliminary flash light emission.

As shown in FIGS. 1 and 2, the flux of light (or beam of light or luminous flux) "L" of an object to be photographed directed towards the camera 1, passes through the taking lens 3, and then reaches a main mirror 13 installed inside a housing 10 of the camera body 2. Most of the flux of light "L" is reflected on (or by) the mirror 13, and is focussed onto a focussing screen. A user who looks through a viewfinder of the camera, can observe an image which is formed on the focussing screen as an erect real image, via a pentagonal roof prism 12.

Part of the flux of light having reached the mirror 13, passes through a semi-transparent mirror locating on a central part of the mirror 13, is reflected on (or by) a sub-mirror 14 positioning behind the main mirror 13, and is led towards the focus detecting module 15. The focus detecting module 15 has a multi area focus detection sensor 16 (hereinafter, also referred to as multi-AF sensor or AF sensor) having a construction or mechanism as shown in FIG. 4.

The AF sensor 16 has a focus detection region for receiving a part of the whole flux of light of an object which passes through lenses 22 of the taking lens 3. The part of the whole flux of light thereof is divided into a plurality of sections on the focus detection areas of the AF sensor 16, and a signal is outputted per section or area in compliance with brightness of the light thereof, from the AF sensor 16. As explained in detail later, the signal outputted from the AF sensor 16 is employed for controlling the focus adjustment and for controlling the amount of the flash light emitted from the flash emitter 27a, 27b of the flash device 4, 4a.

Figure 4:
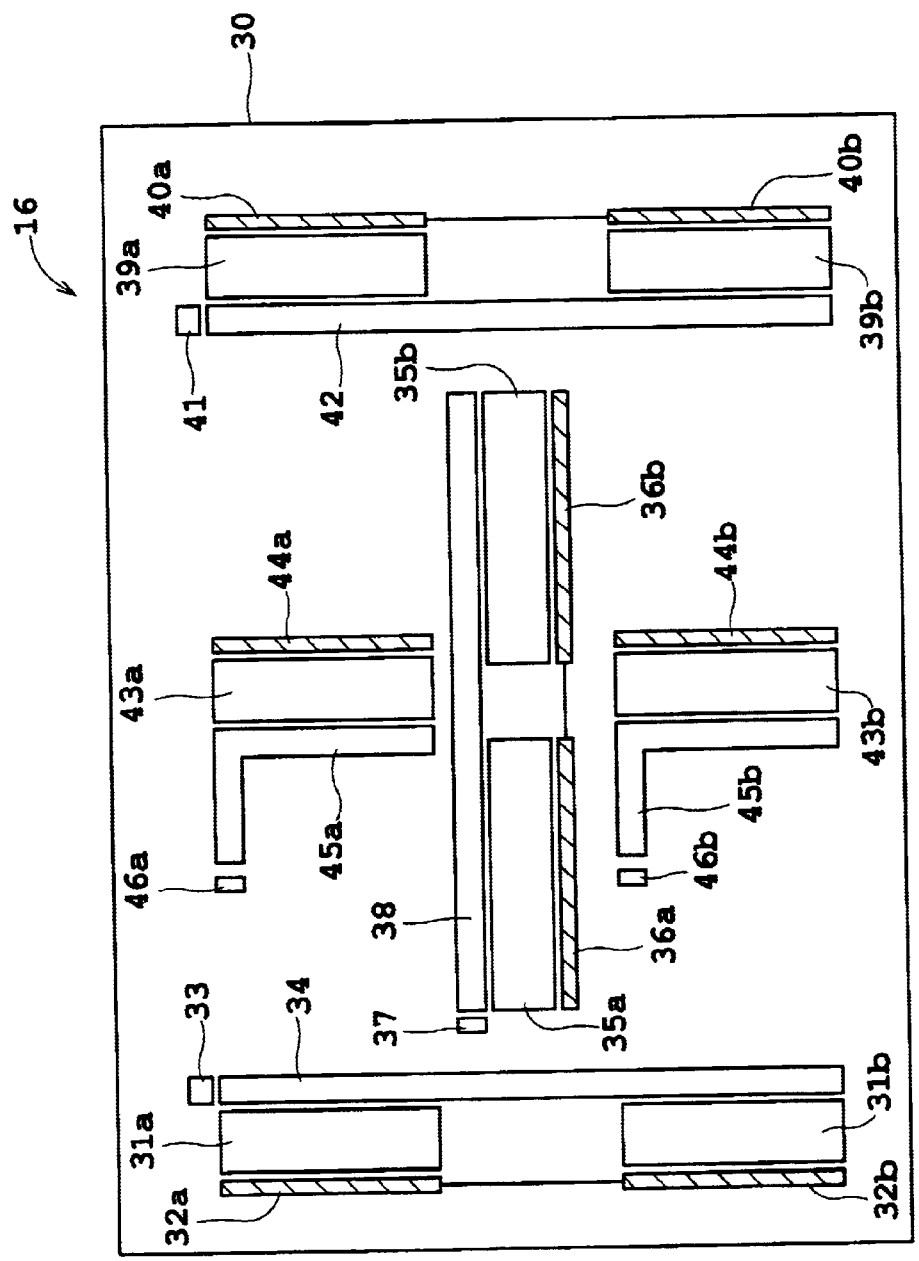
FIG. 4 is a view showing a construction of a multi-AF sensor employed in the camera of FIGS. 1 and 2.

As shown in FIG. 4, the AF sensor 16 has a plurality of CCD sensors which form three areas and four lines. As shown in the same figure, in the central area thereof, the CCD sensors fore a cross shape by two lines.

More specifically, with respect to FIG. 4, a first island is arranged on the left side area of the AF sensor 16; a third island is arranged on the right side area thereof; and a second island and a fourth island are arranged on a central area thereof. That is, the first island has a pair of photo diodes 31a, 31b, a shift register 34, a pair of monitor photo diodes (hereinafter, also referred to as "monitor") 32a, 32b, and an output part 33; the second island has a pair of photo diodes 35a, 35b, a shift register 38, a pair of monitor photo diodes 36a, 36b, and an output part 37; the third island has a pair of photo diodes 39a, 39b, a shift register 42, a pair of monitor photo diodes 40a, 40b, and an output part 41; and the fourth island has a pair of photo diodes 43a, 43b, a pair of shift registers 45a, 45b, a pair of monitor photo diodes 44a, 44b, and a pair of output parts 46a, 46b.

Each photo diode is composed of a plurality of pixels (or picture elements), and the photo diode is part of the sensor for performing an electrical charge integral by receiving the light of an object to be photographed. The shift register is part of the CCD for transmitting the output from the photo diode to the output part. The monitor (i.e. monitor photo diode) is employed for controlling the amount of the light; namely, the electric charge integral by the photo diode is automatically finished when the output reaches a predetermined level. The multi-AF sensor 16 measures the brightness (or luminance) distribution of an object to be photographed, per island.

In a case that the signal(s) outputted from the AF sensor 16 of the camera 1, is(are) employed for adjusting its focus, the information, upon the brightness distribution of the object to be photographed, outputted from the AF sensor 16 which receives the light reflected by the object, is sent to the camera CPU 11. Then, the CPU 11 determines which object positioning in which island should be focussed on, the CPU 11 communicates with the lens CPU 24, and a focusing lens unit of the lenses 22 is moved or shifted so as to focus the lenses 22 on the object to be photographed.

On the other hand, in a case that the signal(s) outputted from the AF sensor 16 is(are) employed for controlling the amount of the flash light emitted from the flash device 4, 4a, the electrical charge integrals corresponding to the amounts of the light reflected from the object when a preliminary flash light emission is not made by the flash device (i.e. when the light from the object is available light) and when the preliminary flash emission is made, are executed, and then the amount of a main flash light to be emitted from the flash device is determined on the basis of the output from the monitor of each island. Instead of employing the monitor, it is possible to use outputs from the pair of photo diodes in each island.

The range from maximum to minimum signal levels that the AF sensor can integrate, is narrow. Therefore, when the AF sensor is employed for detecting the amount of the flash light emitted by the flash device, the following phenomena may occur in part of the islands or the whole islands.

That is, when the amount of the preliminary emission of flash light from the flash device is large, or when the object to be photographed is close to the camera, the electrical charge integral is automatically finished, generally, as soon as the flash light is preliminarily emitted from the flash device, making the output from the monitor overflow. As a result, it becomes difficult to gain a proper piece of information upon the brightness. On the other hand, when the amount of flash light emitted from the flash device is too small, or when the object is far away from the camera, there is no difference in output from the monitor between the condition in which the preliminary flash light emission is made and the condition in which the light from the object is the available light. As a result, it is not possible to calculate the amount of flash light at time of the main flash emission. The process of operation of the camera under this condition will be explained later.

The shutter control unit 19 controls an opening period of a shutter 17 and a timing of driving the shutter 17, on the basis of the instructions from the camera CPU 11. The shutter control unit 19 has a shutter driver 19a (see FIG. 3). When the shutter 17 is released by the shutter driver 19a, the light "L" coming from the object reaches a film 18, and the film 18 is exposed to the light "L".

The photometric module 20 is a module which is employed for measuring the brightness of the object. Namely, the photometric module 20 measures the brightness thereof by receiving part of the flux of light of the object passing through the pentagonal roof prism 12. The information upon the brightness of the object measured by the photometric module 20 is sent to the camera CPU 11.

A zoom encoder 23 installed inside the taking lens 3, is an encoder for detecting its focal length. Namely, the zoom encoder 23 detects a position of a zooming lens unit of the lenses 22, and it outputs the information upon the focal length of the lenses 22 to the lens CPU 24. The lens CPU 24 communicates with the camera CPU 11, in order to transmit the information upon the focal length thereof and the information upon the aperture.

A DX circuit 28 (see FIG. 3) is employed for reading a DX code designated on a film cartridge or film container. The DX code includes data about sensitivity of the film (ISO sensitivity), and the like.

Hereinafter, with reference to the figures, it is explained about an operation of taking a photograph by the camera.

Figure 5:
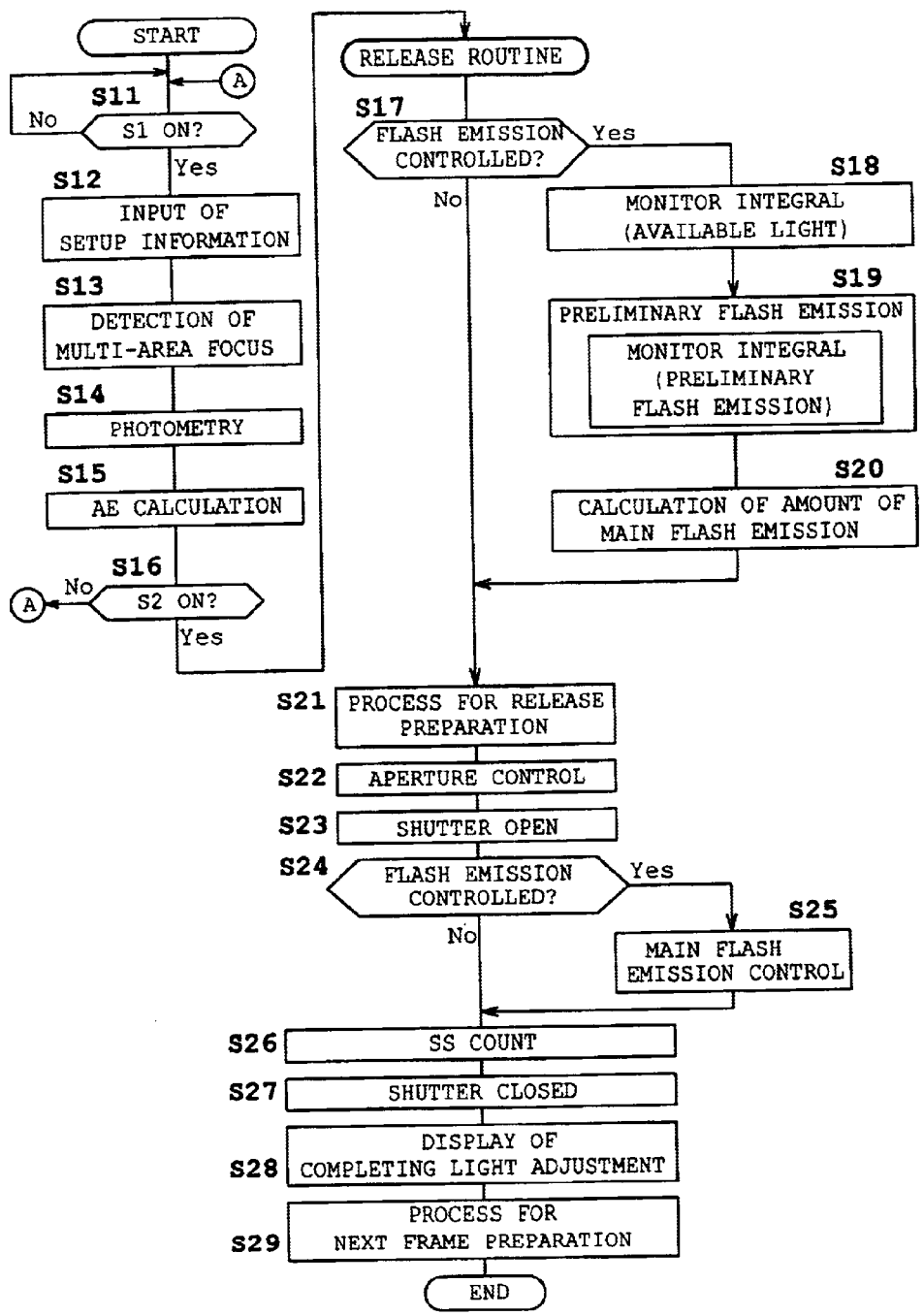
FIG. 5 is a flow chart showing a general process for executing the photographing operation of the camera.

FIG. 5 is a flow chart showing a general photographing operation of the camera. Firstly, at step S11, the camera CPU 11 stands by until a switch S1 is turned on. When a shutter release button is pushed down half (or pushed down up to a half position over the whole length over which the release button moves), the switch S1 is turned on so that the camera starts preparing a photographing operation.

When the switch S1 is turned on, various setup information is inputted to the camera CPU 11 at step S12. The setup information includes, for example, information upon focal length which is inputted from the lens CPU 24, information upon the aperture, information upon the film sensitivity which is inputted from the DX circuit 28, and the like.

Next, the camera CPU 11 determines a main object (or a main subject) to be photographed out of all the objects locating in some or all island(s) of the AF sensor 16, controls the lenses 22 so as to focus it on the main object, and measures the position of the focusing lens of the lenses 22 to derive the distance between the camera 1 and the main object, at step S13.

Next, a photometric process is performed by the photometric module 20 at step S14. When the AF (or auto-focus) process and the photometric process are finished, the CPU 11 performs AE (or automatic exposure) calculation at step S15. At this step, the CPU 11 determines not only whether the flash light should be emitted from the flash device or not, but also the aperture value and the shutter speed.

The CPU 11 repeats the above steps S11 through S15 while the switch S1 is kept on, until the release button is released at step 11 or pushed down completely at step S16. Namely, when the release button is pushed down completely, a switch S2 is turned on so that the release routine starts.

In the release routine, at step 17, it is determined whether the flash light should be emitted from the flash device at time of photographing, on the basis of the AE calculation performed at step S15. When it is decided that the flash light is not emitted therefrom at the step S17, the process of release preparation is executed, at step S21, without controlling the emission of the flash light.

On the other hand, when it is decided that the flash light is emitted from the flash device at the step S17, the flash emission control is performed. Namely, in the flash emission control, on the basis of the reflected light, of the object to be photographed, gotten from the preliminary flash light emission made immediately before releasing, and on the basis of the available light (i.e. of the light from the object without flash light emission), the photometric operation and an operation to estimate it are performed, in order to calculate an emission amount (a guide number) for a main flash light emission.

That is, the brightness of the object to be photographed under the available light is detected per island at step S18. Next, a preliminary flash emission having a predetermined light amount is made, and the brightness of the object to be photographed is detected per island at step S19. Next, the amount of light of a main flash light emission is calculated on the basis of the information upon the above brightness of the object, at step S20. The detail of the process of the flash light emission control will be explained later.

When the flash device emits the main flash light during the exposure of film to the light, the main flash light is emitted in accordance with the light emission amount (the guide number) calculated at the above step S20. In the release routine, an integral is again performed, and the operation to read the data is executed.

According to the embodiment, a flash light with a predetermined amount is emitted preliminarily after the integral is started, and the amount of the reflected light is monitored. After the emission of the flash light, the integral is performed for the same predetermined time as the time during which the aforementioned available light is/are detected, and the integral is finished forcibly.

At the following step S21, a process for release preparation is performed. Namely, the main mirror 13 is swung up, the camera CPU 11 and the flash control module 26 communicate with each other for the mechanical shutter charge, and the flash light emission is made, and so on. Next, the aperture is controlled to operate at step S22, and the shutter is opened to expose the film to the light, at step S23.

When it is decided that it is necessary to control the flash light emission while the shutter is opened at step S24, the control for the main emission of the flash light is performed at step S25, on the basis of the guide number calculated at the aforementioned step S20.

Next, the shutter speed is counted so as to realize a predetermined shutter speed at step S26, after the shutter is opened. After the shutter is opened for a predetermined time, the shutter is closed at step S27. Next, the condition that the light adjustment is accomplished, is indicated on an operation/display part of the camera body 2 at step S28; the mirror is swung down, the information upon the image is imprinted or electrically recorded, one frame of the film is fed (i.e. preparation for the next frame), and the like, at step S29; and then the photographing operation of the camera is finished.

Figure 7:
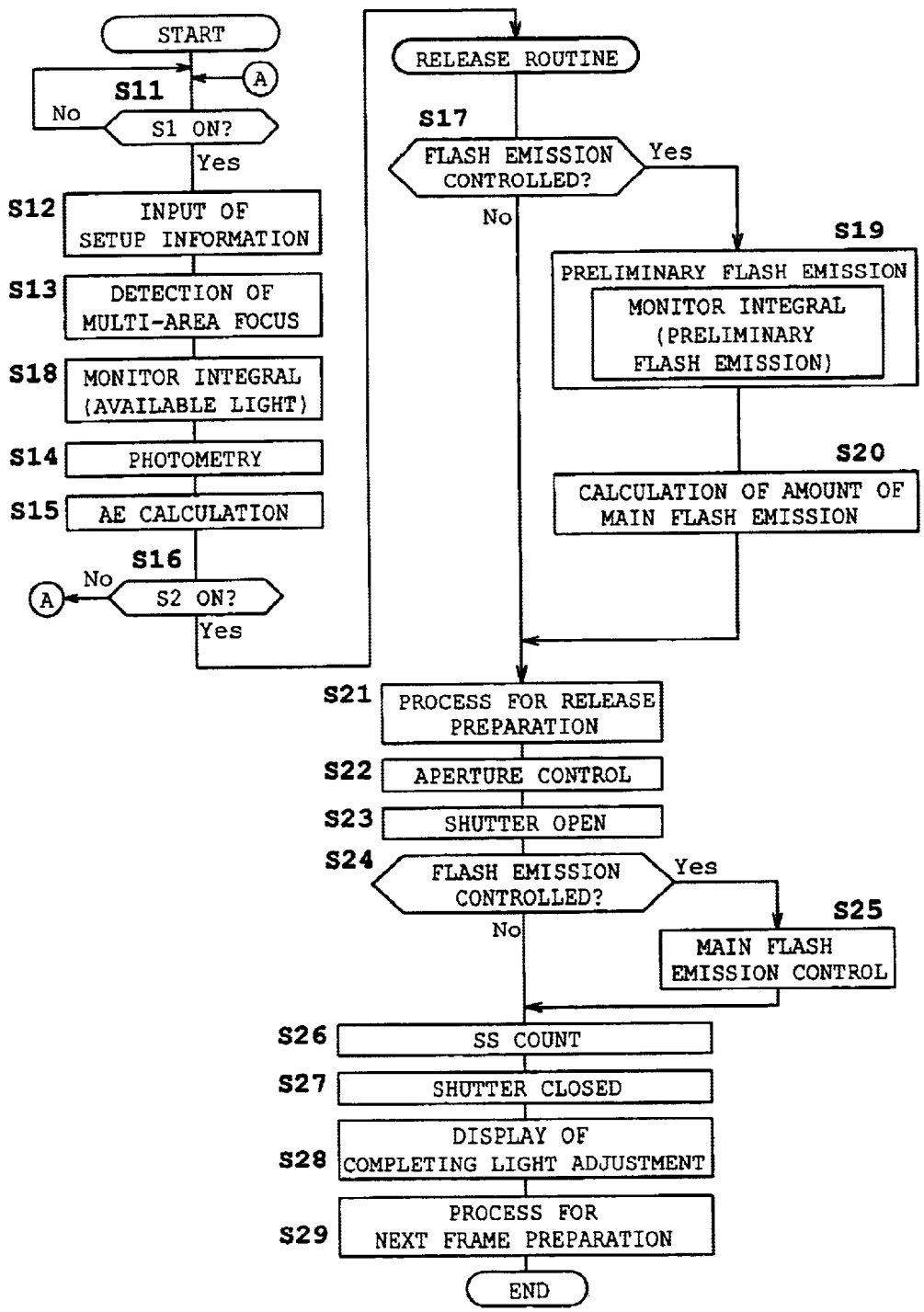
FIG. 7 is a flow chart showing a process for executing the photographing operation of the camera, according to a first modification to the process shown in FIG. 5.

On the other hand, FIG. 7 is a flow chart showing a photographing operation, according to a first modification to the photographing operation shown in FIG. 5, of the camera. That is, in contrast with the photographing operation shown in FIG. 5, according to that shown in FIG. 7, the monitor integral operation performed under the available light at step S18, is performed while the release button is being pressed down half. According to the first modification, the monitor integral operation based upon the available light is performed before the timing when the release button is pressed down completely. Therefore, with the arrangement, it is possible to shorten the time-lag from the time when the release button is pressed down completely to the time when the shutter starts to operate.

Figure 8:
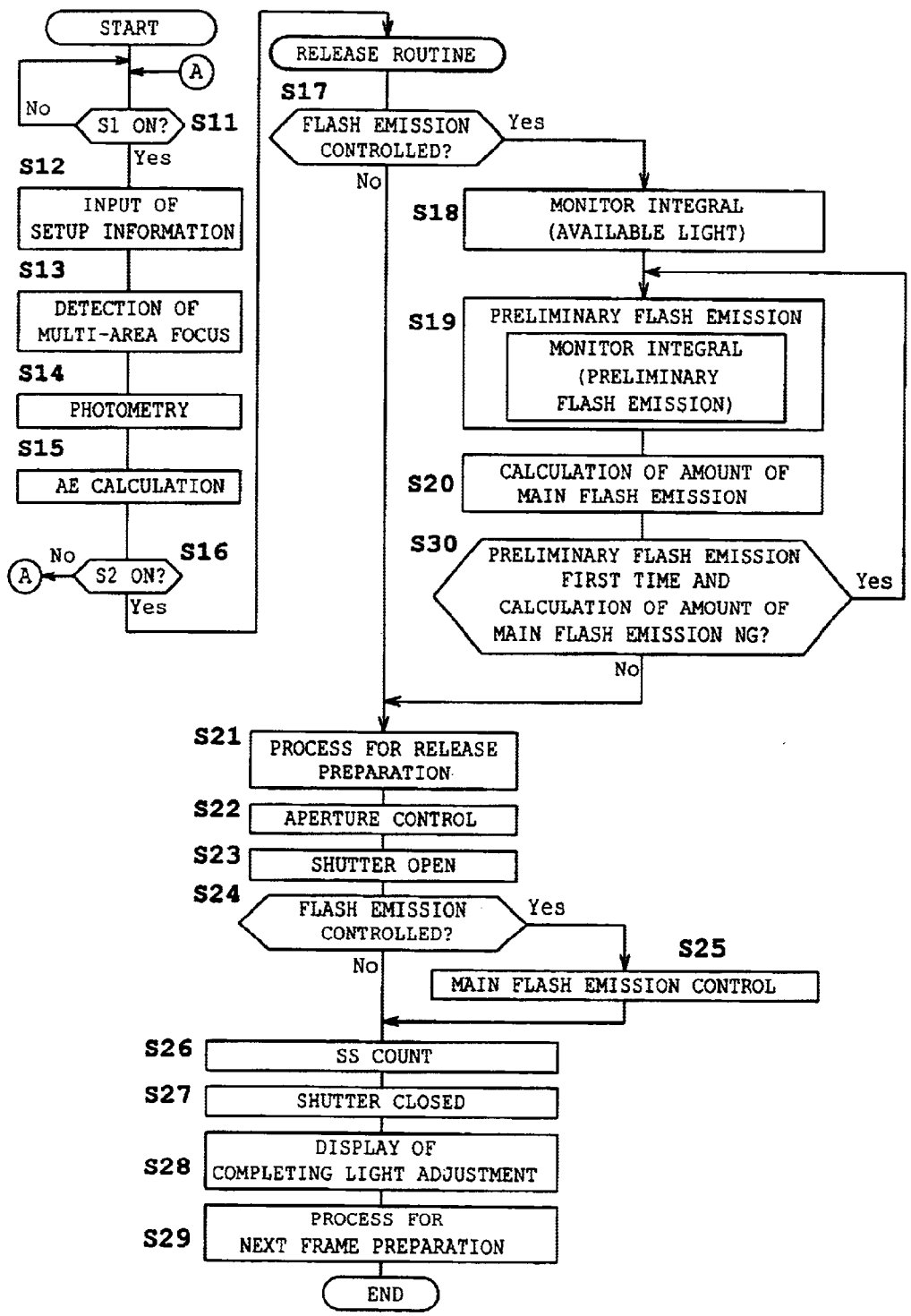
FIG. 8 is a flow chart showing a process for executing the photographing operation of the camera, according to a second modification to the process shown in FIG. 5.
Figure 9:
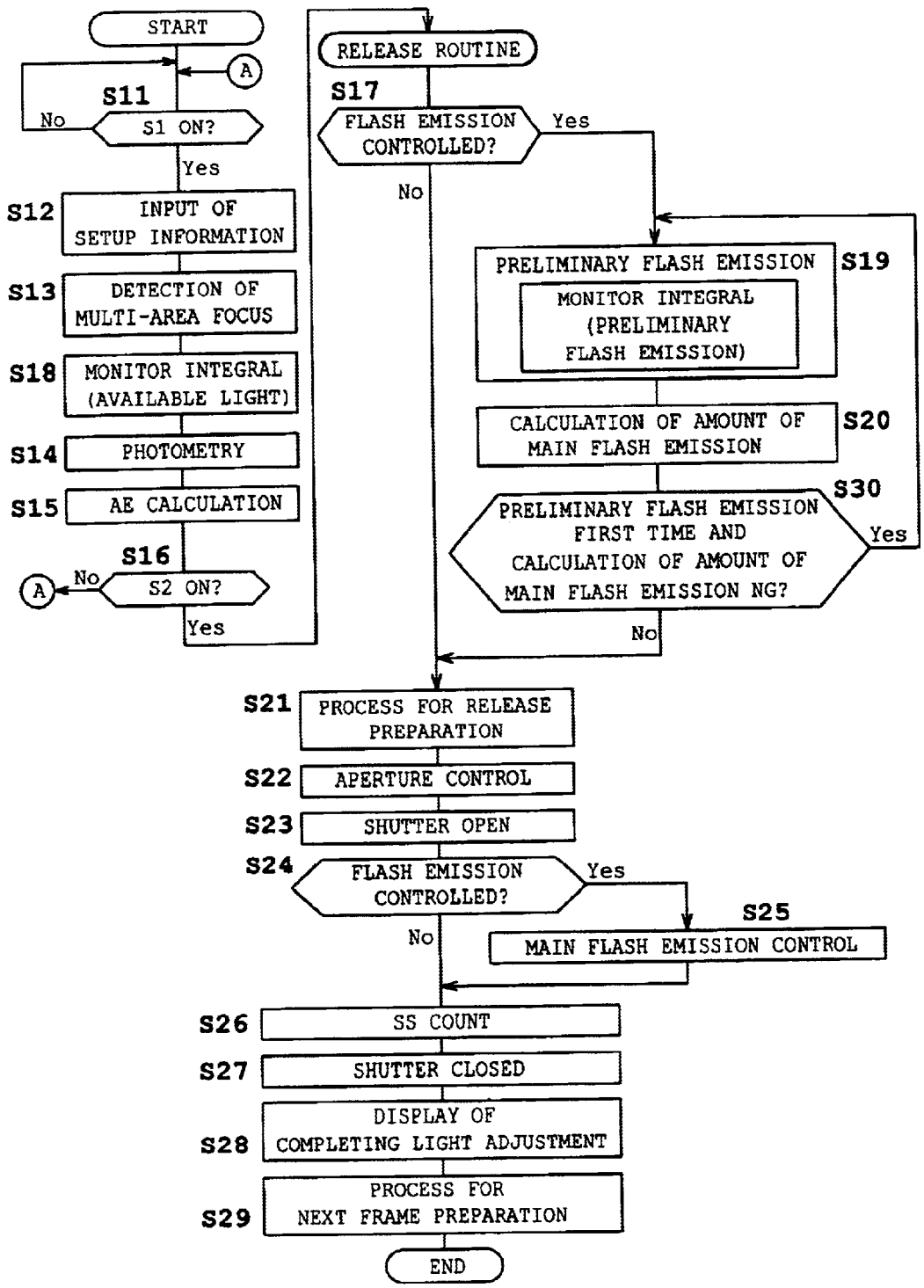
FIG. 9 is a flow chart showing a process for executing the photographing operation of the camera, according to a third modification to the process shown in FIG. 5.

On the other hand, FIG. 8 is a flow chart showing a photographing operation, according to a second modification to the photographing operation shown in FIG. 5, of the camera; and FIG. 9 is a flow chart showing a photographing operation, according to a third modification to the photographing operation shown in FIG. 5, of the camera. In the operation according to the third modification shown in FIG. 9, the monitor integral operation performed under the available light at step S18, is performed while the release button is being pressed down half, like in the operation according to the first modification shown in FIG. 7. In contrast with the first modification, according to each of the second and third modifications, when the amount of light of the main flash light emission during the flash light emission control, can not be calculated, the process for performing the preliminary flash light emission is redone only once, at step S30. In a case that the process for performing the preliminary flash light emission is redone in this way, it is preferable that the light amount (guide number) of the second preliminary flash light emission is different from that of the first preliminary flash light emission.

In each of the second and third modifications (refer to FIGS. 8 and 9), the second light emission amount (guide number) for the preliminary flash light emission which is to be redone, is set to be twice as great as the first light emission amount (guide number) for the first preliminary flash light emission.

The first and second light emission amounts are, however, not limited to those in the aforementioned modification. For example, in a case that the monitoring output at time of the first preliminary flash light emission is overflown (i.e. excessive), the second light emission can be set to be half of the first light emission amount; and in a case that there is no substantial difference in the monitoring output between the state of the first preliminary flash light emission and the state of the available light (i.e. in a case that there is no reflection light from the object to be photographed), the second light emission amount can be set to be twice as great as the first light emission amount.

Next, with reference to FIGS. 5, 7, 8 and 9, it is explained about a process at each step taken during the photographing operation of the camera.

(Detection of Multi-Area Focus)

Figure 10:
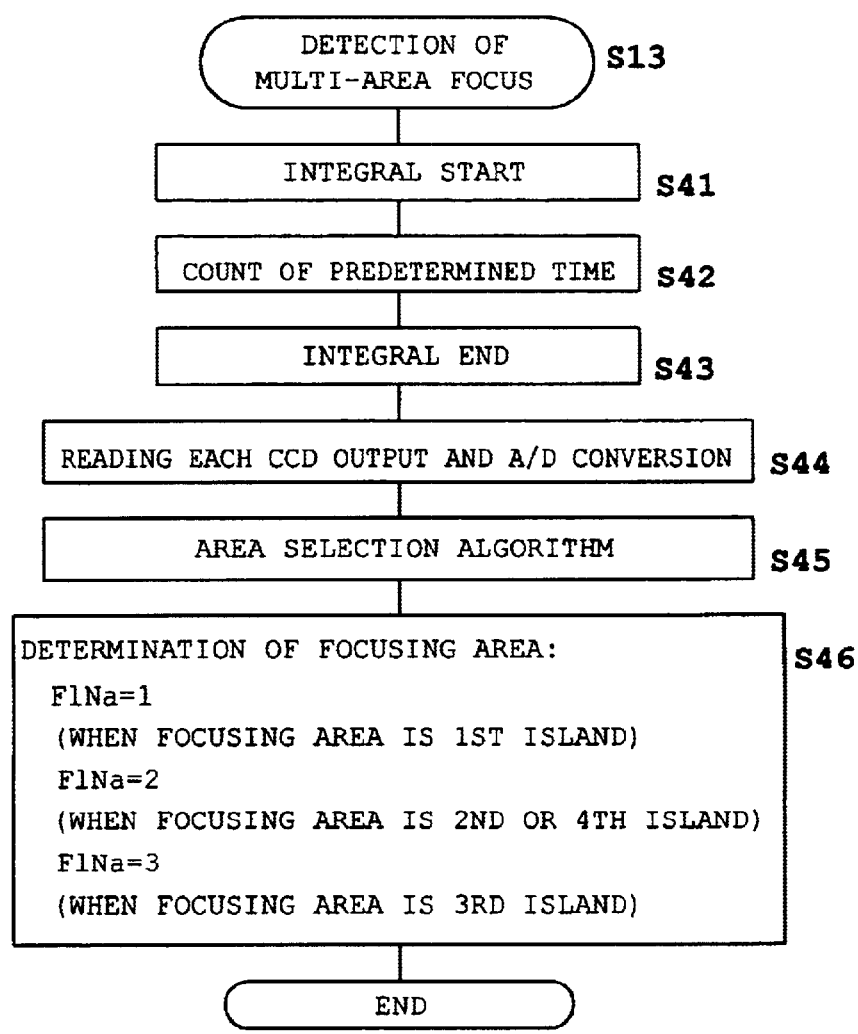
FIG. 10 is a flow chart showing a multi-AF process of the camera.

FIG. 10 is a flow chart showing a process of a multi-area focus detection at step S13 of FIGS. 5, 7, 8 and 9. In the process thereof, the electrical charge integral is executed per island of the AF sensor 16, at step S41. The maximum time duration for executing the electrical charge integral is set to be 200 ms. As soon as the integral starts, the predetermined time starts to be counted, at step S42. When the predetermined time elapses, the electrical charge integral is finished at step S43.

When the electrical charge integral is finished, the output from the CCD (i.e. photo diode) of each island is read out, and the A/D conversion thereof is performed, at step S44. The camera CPU 11 receives the output therefrom, and it starts up an area selection algorithm for determining which island is to be the focus area. Taking the selected island as a standard or reference, an operation for the focus adjustment is performed at step 345. As the area selection algorithm, for example, any conventional algorithm, like an algorithm for selecting a closest area by priority, can be employed.

When the focus area is determined, a focus area storage RAM (Flna) stores data upon which area is the focus area.

According to the embodiment, when the focus area is the first island, a number of "1" is stored or memorized on the Flna; when the focus area is the second or fourth island, a number of "2" is stored or memorized on the Flna; when the focus area is the third island, a number of "3" is stored or memorized on the Flna, at step S46; and then the multi-area focus detection process is finished. The value of the Flna showing the focus area, is employed for determining an island, as a standard island (or a reference island), employed at time of the preliminary flash emission, the process of which is performed at a later step.

(Monitor Integral/Available Light)

Figure 11:
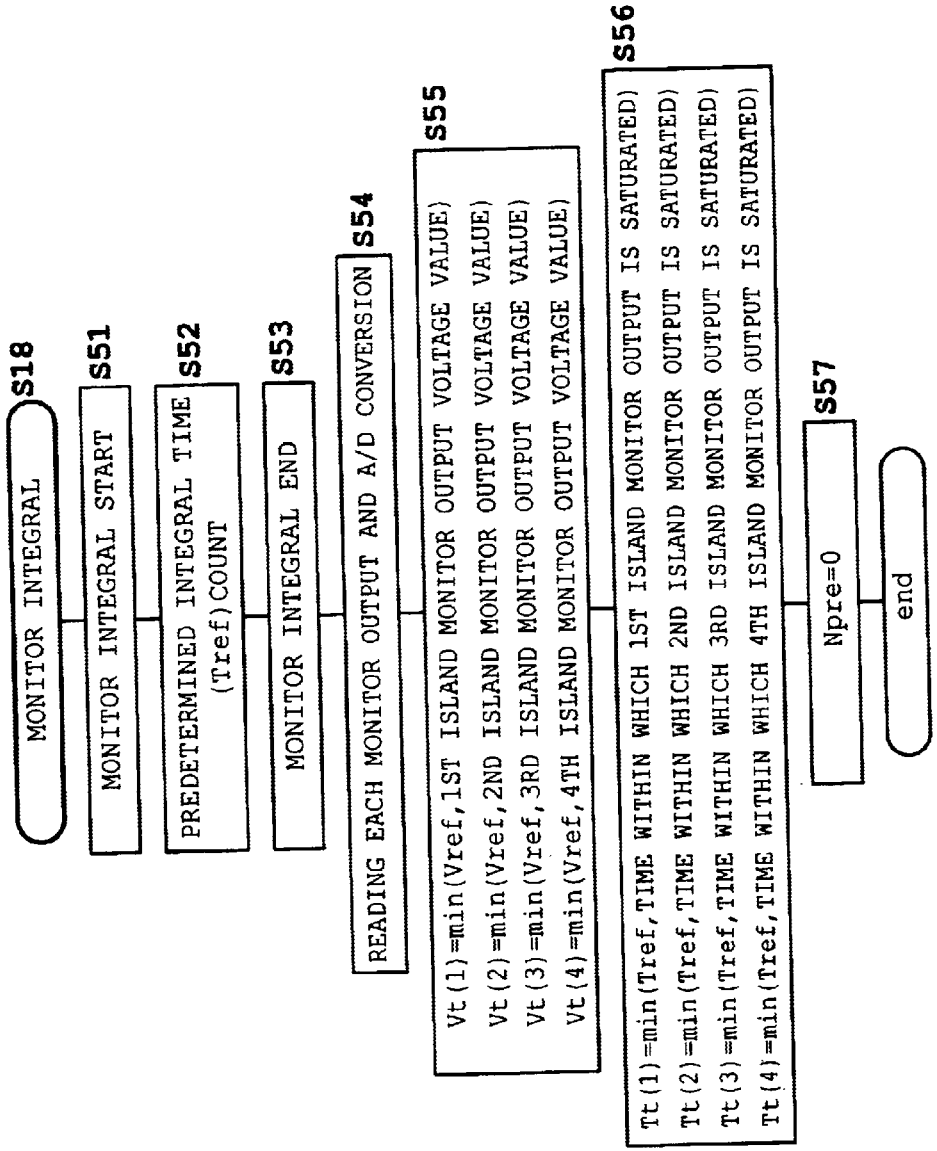
FIG. 11 is a flow chart showing a process for a monitor integral, executed by the camera, under a condition of available light.

FIG. 11 is a flow chart showing a process for performing the monitor integral, under an available light, performed at step S18. On the other hand, FIG. 6 is a timing chart showing signals employed for controlling the emission of the flash light.

Figure 6:
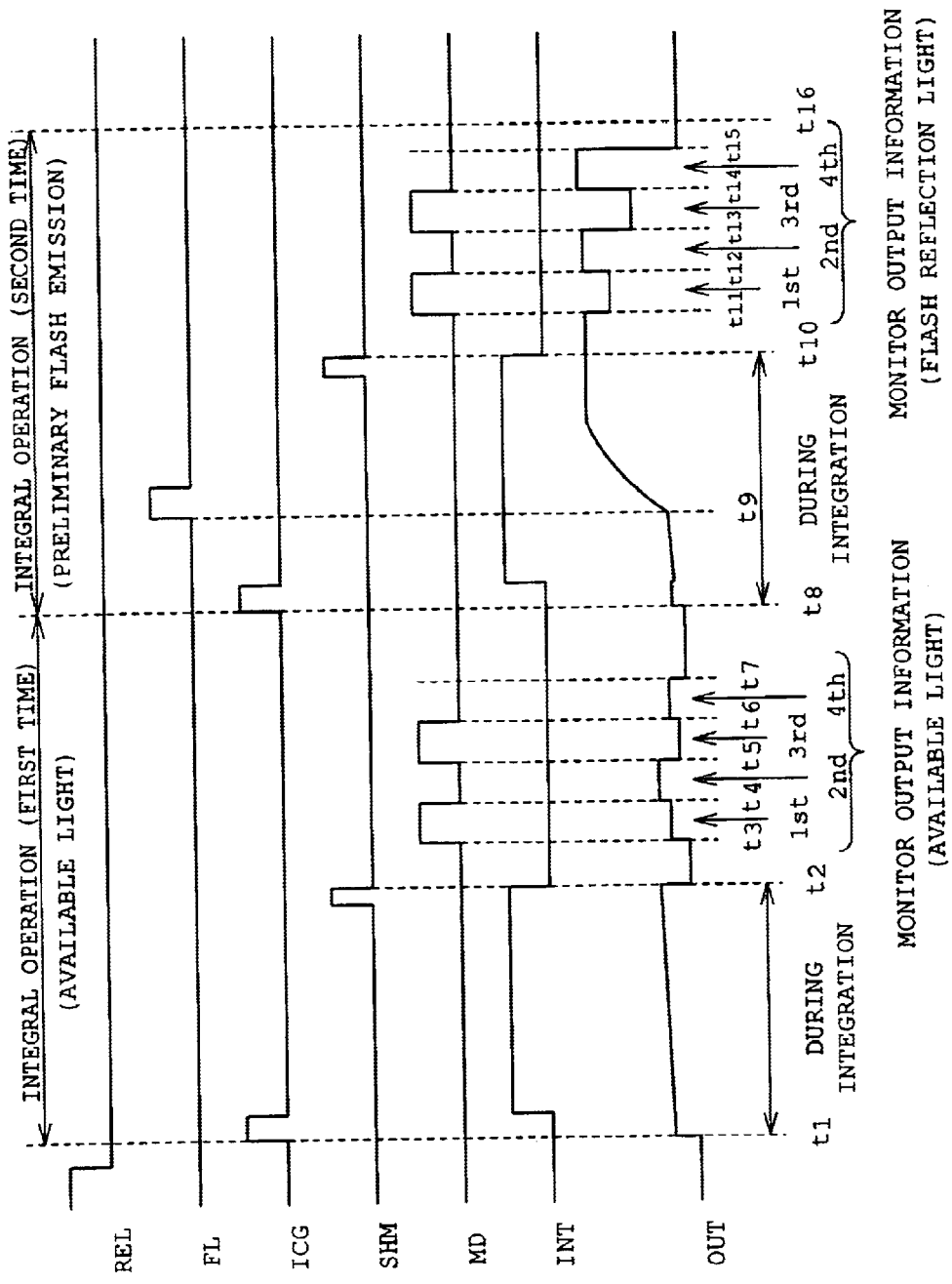
FIG. 6 is a chart showing a timing of various signals for controlling the flash light emission in the photographing process shown in FIG. 5.

Referring to FIGS. 6 and 11, when the release routine starts, the release start signal (REL) becomes low. Then, when a predetermined time elapses, a process for the monitor integral under the available light starts at step S51. At a timing of "t1", an electrical charge integral start signal (ICG) becomes high, and the AF sensor 16 starts storing the electrical charge of an available light component of the object light "L" reflected by the sub-mirror 14 (refer to FIG. 1). The camera CPU 11 counts a predetermined time (2 ms) after the integral starts at step S52. Then, when the predetermined time elapses, the integral end/reading start signal (SHM) becomes high at a timing of "t2", and the monitor integral is ended, at step S53.

While the electrical charge integral is being performed, the sensor output signal (or integral information) (INT) is high. During the time period, when the monitor output reaches a predetermined level (or a permissible level of stored electrical charge), the integral is ended per island.

Figure 12:
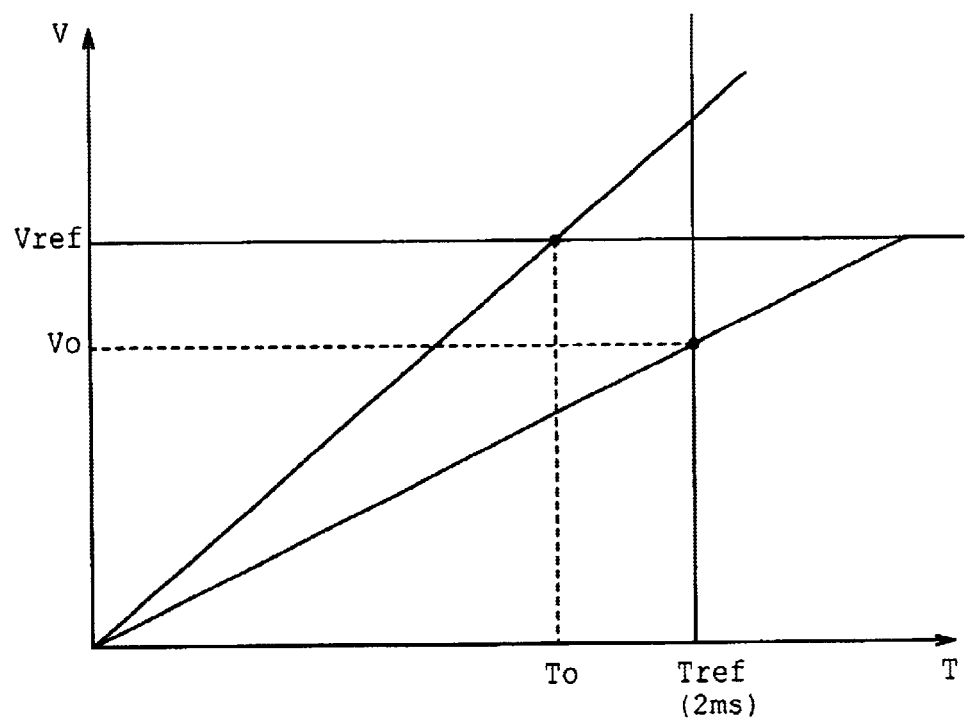
FIG. 12 is a graph showing a relation between integral time and stored electrical charge.

FIG. 12 shows a relation between the integral time (T) and the stored electrical charge (V). As shown in the graph, the electrical charge stored is proportional to the integral time. Higher the brightness of the object to be photographed, greater the inclination of the line in the graph. In the monitor integral, the integral time of "Tref" is set to be 2 ms. When the stored electrical charge does not reach the permissible value (or amount) of "Vref" before the predetermined time of 2 ms elapses, both of the predetermined time of "Tref" and the stored electrical charge of "V0" at the time of "Tref" are outputted. On the other hand, when the time (or time duration) elapsing to allow the stored electrical charge to reach that of "Vref", is shorter than the time of "Tref", the integral operation is ended without performing the operation for the predetermined time. Instead, both of the permissible value (or amount) of "Vref" of the stored electric charge and the time of "T0" are outputted when the electric charge reaches the "Vref".

Concerning the output signal (monitor information, pixel output) (OUT) during the time duration from "t1" to "t2", the monitor output of a typical island (the second island in the embodiment) is outputted in real time. When the "SHM" signal becomes high in the elapse of the predetermined time of "Tref" and the integral operation is ended, the monitor output starts to be read out, at step S54. Regarding the monitor output, synchronizing the mode signal (MD) (t3 to t7), digital information upon the integral is outputted from the INT terminal, and the monitor output at time of termination of the integral of each island is outputted from the OUT terminal. The components of the available light are gained by performing a A/D conversion of the monitor outputs.

According to the embodiment, the AF sensor is also employed as a sensor for controlling the flash light adjustment. In contrast with a case in which the AF sensor is employed for detecting the focus, the integral time is set to be short (2 ms). Therefore, generally, under a condition of brightness in which a flash light is employed, the monitor output is relatively small in value.

Next, at step S55, the monitor output Vt(n) of each island under the available light is determined on the basis of the monitor output gained from the AF sensor 16, where "n" indicates the number of island. Regarding the monitor output Vt(n) of the stored electrical charge with respect to the n-th island, the smallest value of the aforementioned Vref and V0 is adopted or employed.

Next, at step S56, the monitor output integral time Tt of each island under the available light is determined. Regarding the monitor output integral time Tt of the n-th island, the smallest value of the aforementioned Tref and To which is the time when the monitor output is saturated, is adopted or employed.

When all the monitor outputs Vt and all the monitor output times Tt are outputted, a flag Npre which indicates the number of the preliminary flash light emission(s) is reset to be zero at step S57, and then the process is finished.

(Preliminary Flash Light Emission)

Figure 13A:
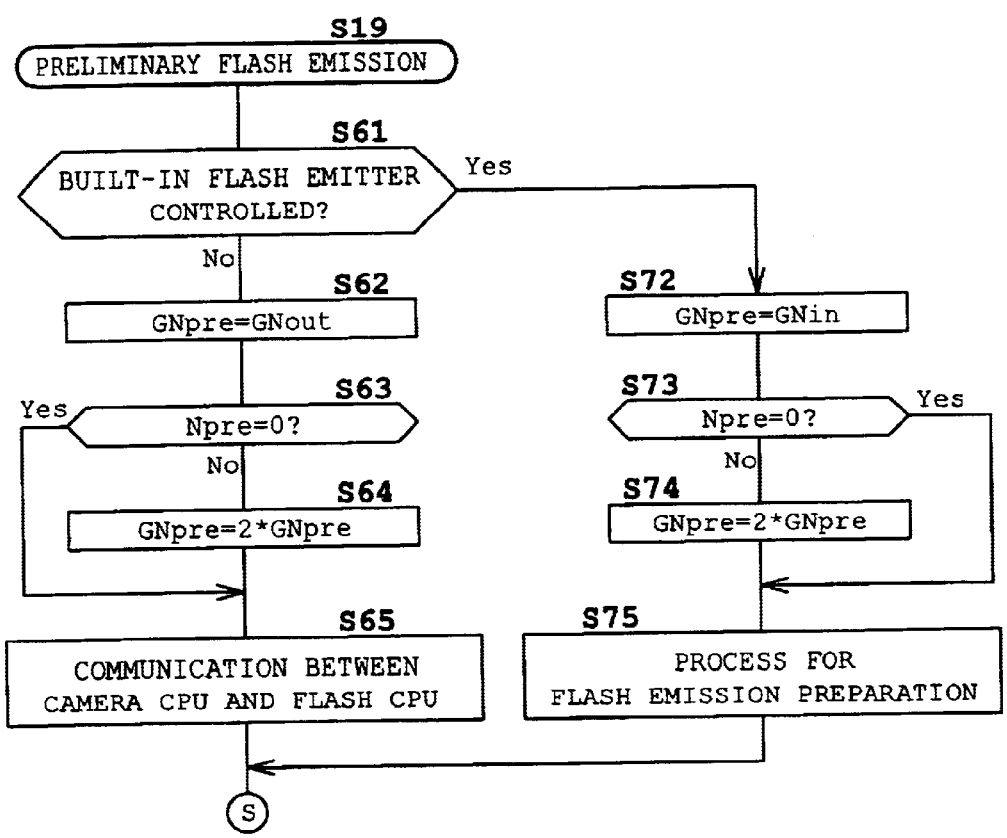
FIG. 13A is a flow chart showing a process for a preliminary flash light emission.
Figure 13B:
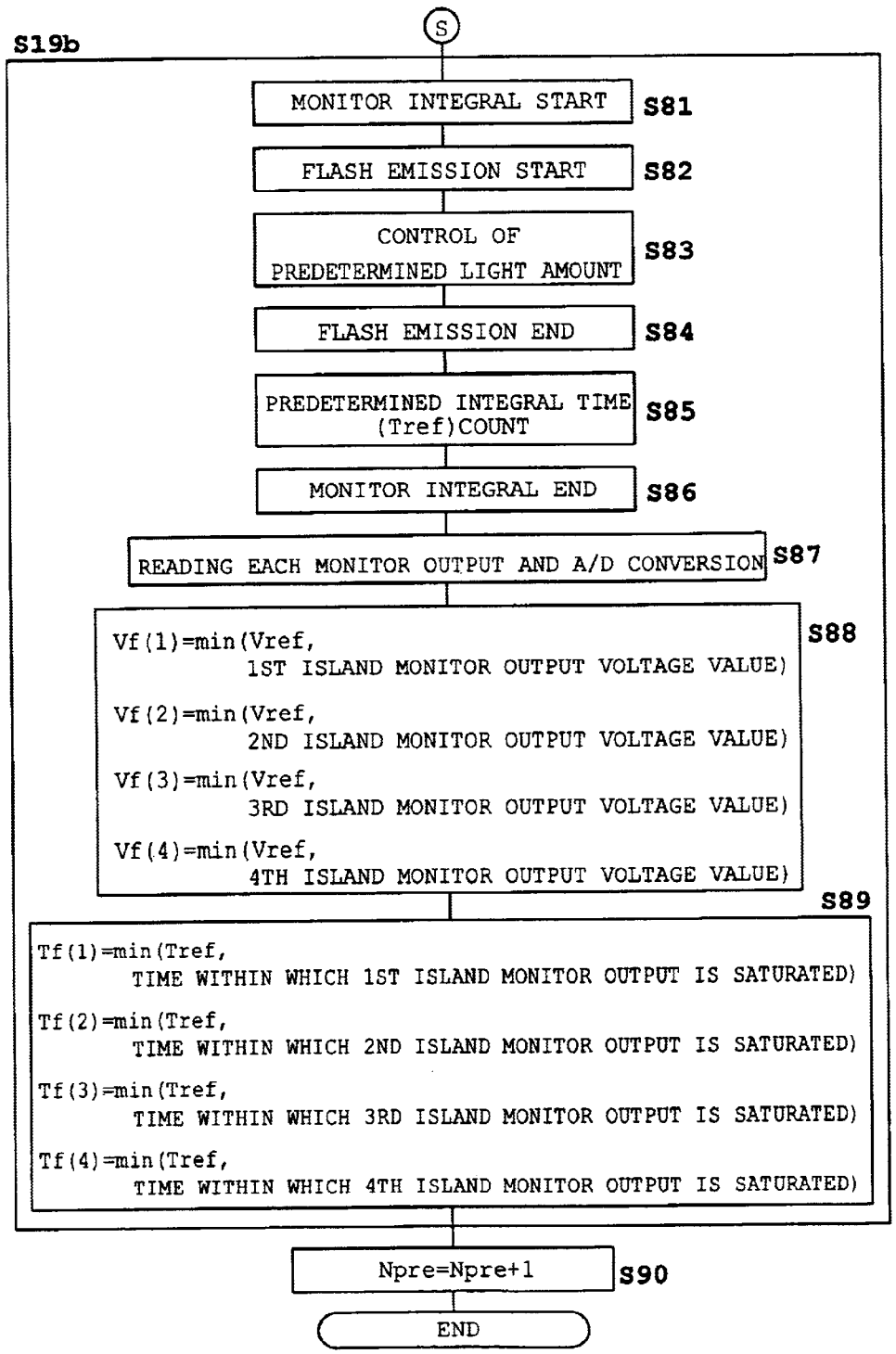
FIG. 13B is a flow chart showing the process for the preliminary flash light emission.

Next, it is explained about a process or steps for emitting the flash light preliminarily and for performing an integral again. FIGS. 13A and 13B is a flow chart showing the process for the preliminary flash light emission (step S19).

Firstly, at step S61, it is determined whether the flash device is the buit-in flash device 4a or the external flash device 4. When it is determined that the flash device is the external flash device 4, the light emission amount, i.e., the guide number GNpre for the preliminary flash light emission is set to be a predetermined guide number (light emission amount) GNout for the preliminary flash light emission made by the eternal flash device 4, at step S62. In the embodiment, the value of the GNout is set to be 2.8. On the other hand, when it is determined that the flash device is the built-in flash device 4a, the guide number GNpre for the preliminary flash light emission is set to be a predetermined guide number (light emission amount) GNin therefor, at step S72. In the embodiment, the value of the GNin is set to be 1.4. The value of GNout and the value of GNin can be constant values, respectively, regardless of photographing conditions. Alternatively, those values can be variable values, respectively, depending upon photographing conditions. For example, such a guide number as gained from a distance between the object to be photographed and the camera and from a setup value of the aperture, can be employed.

Next, it is determined at step S63, 73 whether the flag Npre showing the number of the preliminary flash light emission(s) is zero or not. Namely, it is determined at the same step whether the amount of light of the main flash light emission could calculate or not, on the basis of the first preliminary flash light emission. And if it is determined at the same step that the amount of light of the main flash light emission could not be calculated (i.e. if it is determined at the same step that the flag of Npre is not equal to zero), the value of the guide number GNpre for the preliminary flash light emission is set to be twice as much as itself (i.e. set to be 2*GNpre), at step S64, 74. Subsequently, for the arrangement in which the built-in flash device 4a is used, the process is finished at step S75; on the other hand, for the arrangement in which the external flash device 4 is used, the information upon the guide number is exchanged between the camera CPU 11 and the flash CPU 26a (see FIG. 3) at step S65. Then, the process for preparing the preliminary flash light emission is finished.

(Monitor Integral/Preliminary Flash Light Emission)

Next, a process for performing the monitor integral operation in a condition in which the flash light is emitted preliminarily, is performed at step S19b (refer to FIG. 13B). Similar to the steps for the aforementioned monitor integral operation under the available light, the electrical charge integral start signal ICG becomes high at a timing of t8 (refer to FIG. 6), the AF sensor 16 starts to store (or accumulate) the electrical charge, at step S81. Then, at step S82, the camera CPU 11 counts a predetermined time (2 ms) after the start of the integral operation. Then, when the predetermined time elapses, an integral end/reading start signal SHM becomes high at a timing of t10 and the monitor integral operation ends, at step S86.

More specifically, at a timing of t9 in the process of the electrical charge integral being performed during the time from t8 to t10, a flash light emission signal FL becomes high, and the emission of the flash light starts at step S82. Then, at step S83, the flash control module 26 controls the light amount in accordance with the guide number GNpre which has been determined at the aforementioned steps S62, S72, S64 and S74. Then, when the amount of the preliminary flash light thus emitted reaches a predetermined amount, the preliminary flash light emission is finished at step S84. Then, the predetermined electrical charge integral time Tref (i.e. 2 ms after the start of the integral operation) is counted at step S85. When the predetermined time elapses, the integral end/reading start signal SHM becomes high at a timing of t10 and the monitor integral operation ends, at step S86.

At time of the preliminary flash light emission, the sensor output signal INT (or integral information) is also high during the electrical charge integral operation. Meanwhile, the sensor output signal OUT at the time of the preliminary flash emission, arises (or increases) abruptly almost at the same time of the preliminary flash light emission. However, because there is a time lag from the electrical charge accumulation (or storage) by the monitor to the output therefrom, the output reaches a value depending upon the amount of the reflected light, only after some time passes and after the light having the amount is received. In the process, in a case that the amount of the reflected light is relatively large, the monitor voltage reaches a predetermined level within the predetermined integral time, and the integral operation may come to an end automatically. In this case, the monitor output is corrected on the basis of the integral time of the automatic ending. Incidentally, whether the integral operation automatically comes to the end before the predetermined integral time elapses, or not, is employed for the overflow determination process explained later.

Next, regarding the monitor output from each island, synchronizing the mode signal (MD) (t11 to t15), digital information upon the integral is outputted from the INT terminal, and the monitor output at time of termination of the integral operation of each island is outputted from the OUT terminal. Similar to the monitor integral under the available light, an A/D conversion of the monitor output is executed at step S87.

Also, in the process for the monitor integral at time of the preliminary flash light emission, similar to the process under the available light, the monitor output Vf(n) of each island at time of the preliminary flash light emission is determined at step S88 on the basis of the monitor output from the AF sensor 16, where "n" indicates the number of island. Regarding the monitor output Vf(n) with respect to the n-th island, the smallest value of the aforementioned Vref and V0 is adopted or employed.

Next, at step S89, the monitor output integral time Tf of each island at time of the flash light emission is determined. Regarding the monitor output integral time Tf(n) of the n-th island, the smallest value of the aforementioned predetermined time Tref and To which is the time when the monitor output is saturated, is adopted or employed, where "n" indicates the number of island.

When the monitor output Vf(n) and the monitor output time Tf(n) of all the islands are outputted, a flag Npre which designates the number of the preliminary flash light emission(s) increments (i.e. Npre=Npre+1) at step S90, and then the step for the monitor integral for the preliminary flash light emission is finished.

(Calculation of Amount of Main Flash Light Emission)

Figure 14:
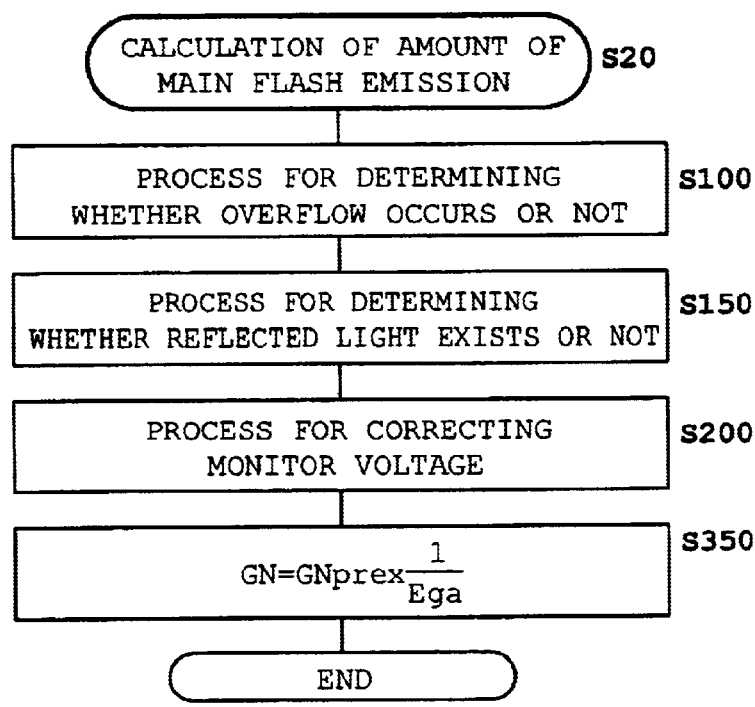
FIG. 14 is a flow chart showing a general process for calculating the amount of light of a main flash emission.

Next, with reference to FIG. 14, it is explained about the process for calculating the amount of light of the main flash light emission (step S20). In the process, the guide number GN employed for the main flash light emission is calculated or sought for, on the basis of a difference between the monitor output gained at time of the available light and the monitor output gained at time of the preliminary flash light emission.

Firstly, in respect of the two monitor outputs, it is determined whether each of the outputs is overflown (i.e. excessive) or not, at step S100. Then, employing the difference between the two monitor outputs, it is determined whether there is a reflected light or not, at step S150. These two determining processes will be explained in detail later.

Subsequently, a process for correcting the monitor voltage is performed on the basis of the results gained from the above two determining processes, at step S200. The process for correcting the monitor voltage is a step for calculating a final monitor voltage coefficient Ega. In this process, the sequence for calculating the final monitor voltage coefficient Ega differs, depending upon the values of the above two monitor outputs. The sequence therefor will be explained in detail later, too.

Finally, employing the final monitor voltage coefficient Ega gained at the above step S200, the guide number GN for the main flash light emission is calculated at step S350. The guide number GN is calculated from both of the final monitor voltage coefficient Ega and the guide number GNpre at time of the preliminary flash light emission, on the basis of the following equation (1).

$$GN=GNpre*1/Ega \qquad (1)$$

Next, it is explained about each step for calculating the amount of light of the main flash light emission (refer to FIG. 14) in detail below.

(Overflow Determination Process)

FIG. 15 is a flow chart showing steps for the overflow determination process at step S100. In the process, the number of area(s) in which the overflow occurs, and which island(s) overflow(s), are determined. The terminology of "overflow" means that the monitor output from the sensor in the island goes beyond, or goes over, a predetermined maximum permissible level or value; in other words, it means that the amount of light of the flash light emission is excessive, by reason that the amount of light emission at the time of the preliminary flash light emission is too large, or by reason that the distance between the object to be photographed and the camera is too short, or the like.

Firstly, Nnov showing the number of area(s) in which the overflow does not occur, is reset to be zero; and at the same time, FFh is inputted to each of NOV(1) to NOV(4), showing an overflow determination flag per island, at step S101. That is, at this step, Nnov and NOV(n) is reset.

Next, at steps S102 through S111, it is determined whether each of the electrical charge integral times Tf(1) to Tf(4), per island, is equal to the predetermined integral time Tref, or not. Namely, at step S102, it is determined whether the value of Tf(1) of the first island is equal to the value of Tref (i.e. 2 ms) or not. If it is determined at the same step that the value of Tf(1) of the first island is not equal to the value of Tref, then it proceeds to the step S104, regarding the first island as being overflown. On the other hand, if it is determined at the same step S102 that the value of Tf(1) of the first island is equal to the value of Tref (i.e. 2 ms), it means that the electrical charge integral process is not forcibly finished before the predetermined time elapses. In other words, it means that no overflow occurs in the area corresponding to the first island. Accordingly, at step S103, "1" (one) is added to Nnov, and at the same time, "0" (zero) is allotted to NOV(1) in order to show that the first island is not overflown.

Next, at step S104, in the same way, it is determined whether the value of Tf(2) of the second island is equal to the value of Tref (i.e. 2 ms) or not. If it is determined at the same step S104 that the value of Tf(2) of the second island is not equal to the value of Tref, then it proceeds to the step S106, regarding the second island as being overflown. On the other hand, if, at the same step S104, the value of Tf(2) of the second island is equal to the value of Tref (i.e. 2 ms), it is determined that the monitor output in the second island is not overflown. Accordingly, "0" (zero) is allotted to NOV(2) in order to show that the second island is not overflown, at step S105.

By the way, in respect of the second island, this island constitutes one area together with the fourth island. Therefore, at the step S105, the process for adding 1 (one) to Nnov being the number of area in which no overflow occurs, is not executed.

Subsequently, in respect of the third island, a determination process (S106 and S107) is performed in the same way as that taken at steps S102 and S103 relative to the first island; and in respect of the fourth island, a determination process (S108 and S109) is performed in the same way as that taken at steps S104 and S105 relative to the second island.

Finally, at step S110, which one of the values of Tf(2) of the second island and Tf(4) of the fourth island is equal to the value of Tref (i.e. 2 ms), is determined. In the same step, if one of the values thereof is Tref, it is determined that the central area is not overflown; consequently, "1" (one) is added to Nnov at step S111.

In short, through all the above steps S100 through S111, the process for determining whether the overflow occurs or not relative to each of the islands or areas, is executed.

(Process for Determining Whether Reflected Light Exists or Not)

Figure 16:
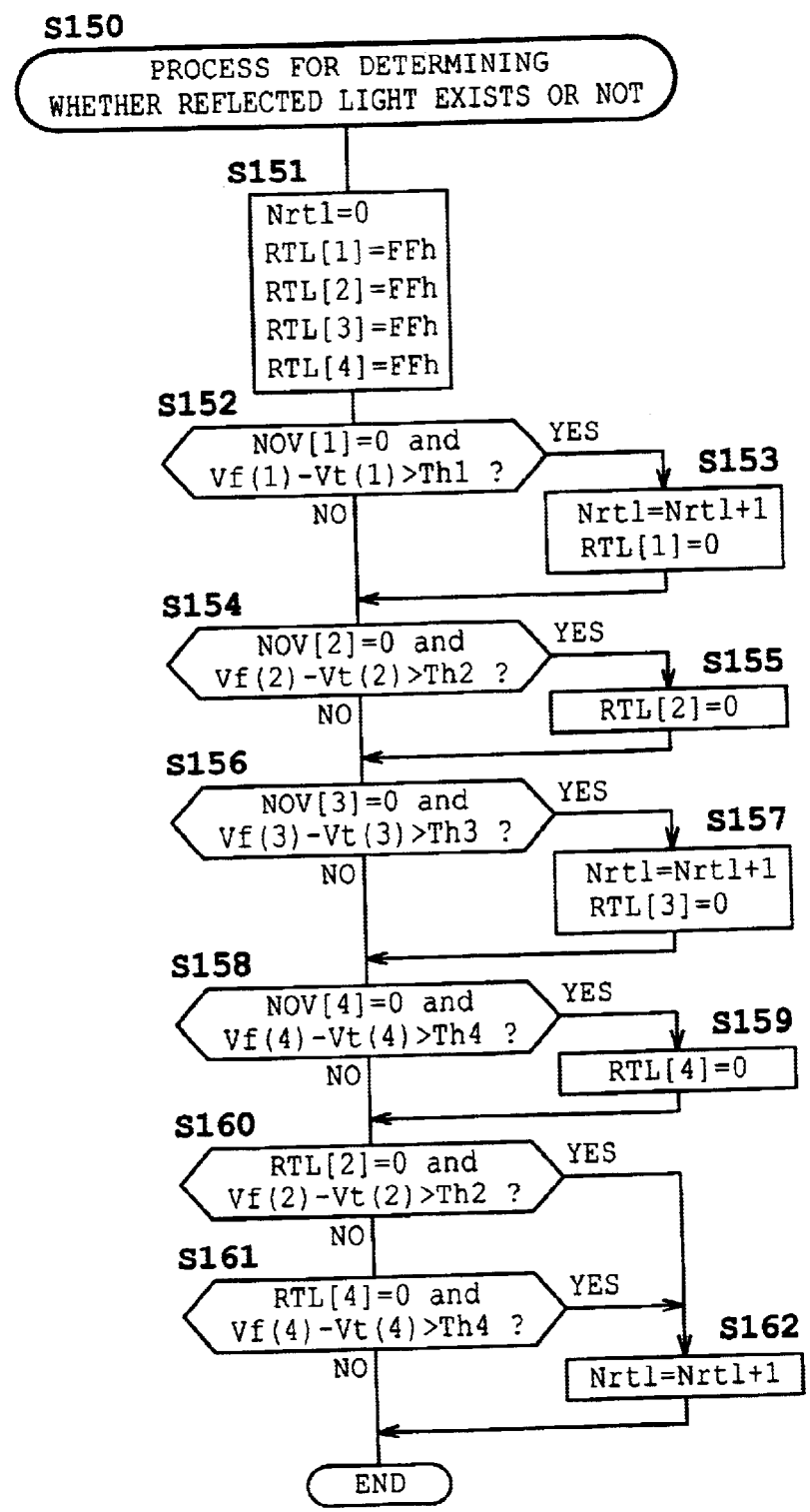
FIG. 16 is a flow chart showing a detailed process for determining whether a reflected light exists or not.

FIG. 16 is a flow chart showing a process for determining whether there exits a reflected light or not (S150). In the process, not only the number of area(s) in which the output (s) is/are not overflown and in which there exits reflected light, is counted, but also it is determined which island(s) is/are the island(s) in which the output(s) is/are not overflown and in which there exits reflected light. As explained in detail later, the process for determining whether there exits the reflected light or not, is performed by taking a difference between the monitor output Vt(n) at time of the available light and the monitor output Vf(n) at time of the preliminary flash light emission. When the difference does not go beyond a predetermined threshold value, namely when the difference in brightness of an object to be photographed is small between the condition in which the monitor output is gained under the available light and the condition in which the monitor output is gained at time of the preliminary flash light emission, it means a lack of the amount of light of the flash light emission, on the basis of a reason that the amount of light of the preliminary flash light emission is too small, or on the basis of a reason that the object to be photographed is too far away from the camera.

Firstly, Nrtl which is the information showing the number of area(s) in which there is no overflow of the output and in which there exists the reflected light, is reset to be "0" (zero); and at the same time, a code of FFh is allotted to a flag of each of RTL(1) to RTL(4) for determining whether no overflow occurs and there exists the reflected light, per island, at step S151. Namely, at this step, each of Nrtl and RTL(n) is set as a condition of default.

Next, it is determined whether the monitor output is not overflown and the value of the reflected light exceeds a predetermined value, per island. That is, at step S152, it is determined whether the overflow determination flag NOV (1) of the first island which is determined at the overflow determination process at step S102 is "0" (which means that the monitor output from the first island is not overflown) and the difference between the monitor output Vf(1) at time of the preliminary flash light emission and the monitor output Vt(1) at time of the available light is over a threshold voltage Th1. If these conditions are not satisfied, it means that the first island is overflown or that no reflected light exists, so that it proceeds to the next step S154.

On the other hand, if the overflow determination flag NOV(1) of the first island is "0" and the difference between the monitor output Vf(1) at time of the preliminary flash light emission and the monitor output Vt(1) at time of the available light is over a threshold voltage Th1, "1" (one) is added to Nrtl which is the information showing the number of area in which no overflow occurs and in which the reflected light exists, and "0" (zero) is allotted to RTL(1) in order to show that there is no overflow and that there is the reflected light, in respect of the first island, at step S153.

Regarding the second island, the same determination process as that executed at step S152 is performed at step S154. If the conditions are not satisfied, it proceeds to the step S156 for the determination process for the third island.

If it is determined at step S154 that the aforementioned conditions are satisfied in respect of the second island, "0" (zero) is allotted to RTL(2) in order to show that there is no overflow and there is the reflected light in respect thereof at step S155.

By the way, the second island forms one central area together with the fourth island. Therefore, the process for adding "1" (one) to Nrtl which is the information showing the number of area in which no overflow occurs and in which the reflected light exists, is not performed.

Subsequently, in respect of the third island, a determination process (S156 and S157) is performed in the same way as that taken at steps S152 and S153 relative to the first island; and in respect of the fourth island, a determination process (S158 and S159) is performed in the same way as that taken at steps S154 and S155 relative to the second island.

Finally, in respect of each of the second island and the fourth island, it is determined whether there is no overflow of the output and there is a reflected light having a value over a predetermined one, at steps S160 and S161, respectively. If the conditions are satisfied in either of the islands, then "1" (one) is added to Nrtl which is the information showing the number of area in which there is no overflow and in which there is the reflected light, at step S162.

By the way, in the embodiment, the values of the threshold voltages of Th1 to Th4 set for respective islands, are set to be the same to each other. Alternatively, the values of the threshold voltages thereof can be different from each other. By making the values of the threshold voltages of Th1 to Th4 different, it is possible to uniformize the mutual levels (or relative levels) amongst respective islands. That is, with the arrangement, it is possible to compensate or correct optical characteristics, such as its aperture area, of the AF sensor module, the monitor output characteristics of the sensors and/or sensitivity characteristics thereof, uneven outputs of the sensors due to temperature condition and electric power condition, and the other conditions; therefore, it is possible to adjust the outputs of the sensors so as to make them uniform or constant (i.e. so as to gain the same results of the outputs) amongst the islands.

(First Example for Correcting Monitor Voltage)

Figure 17:
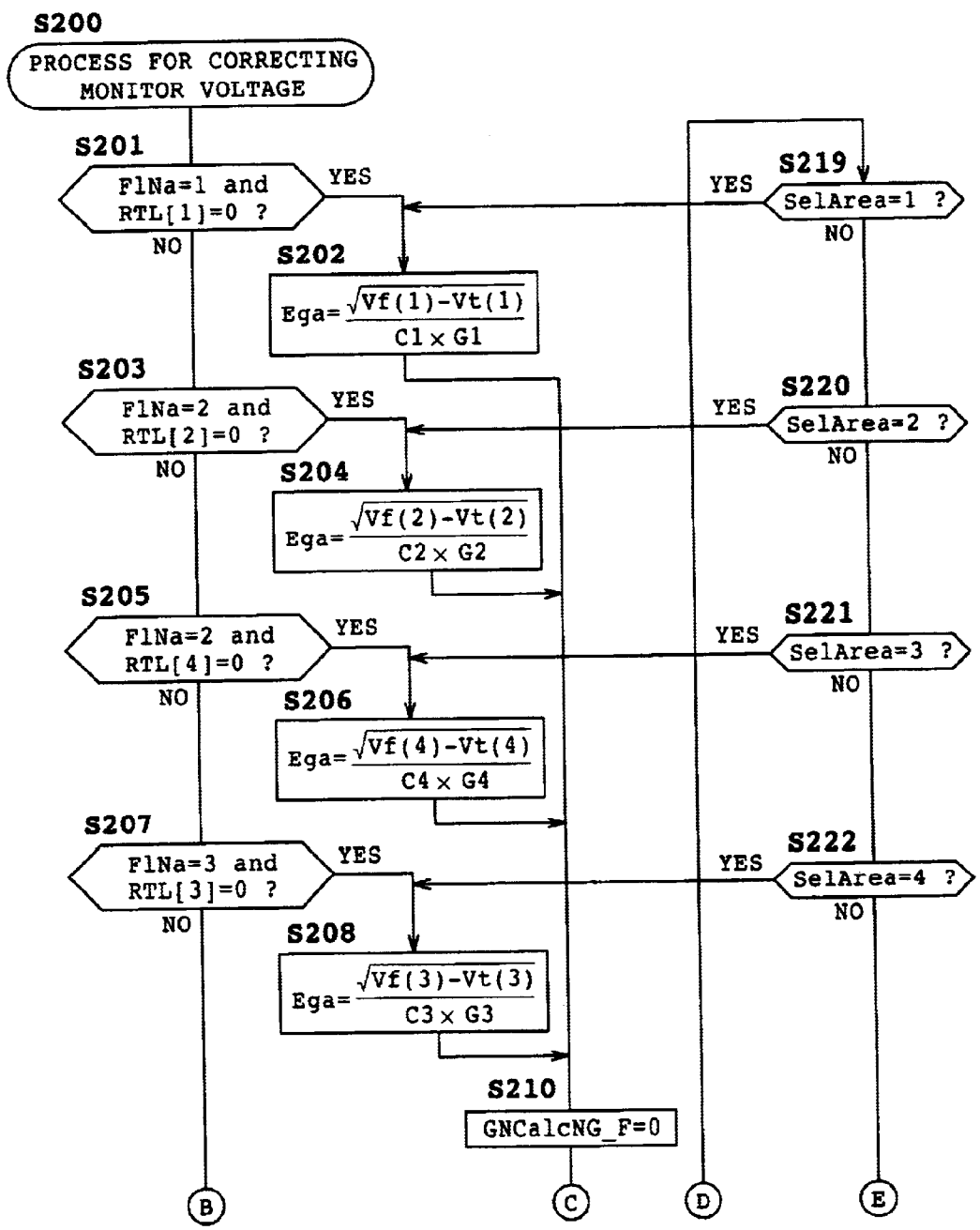
FIG. 17 is a flow chart showing a detailed process for correcting the monitor voltage, according to a first example.
Figure 18:
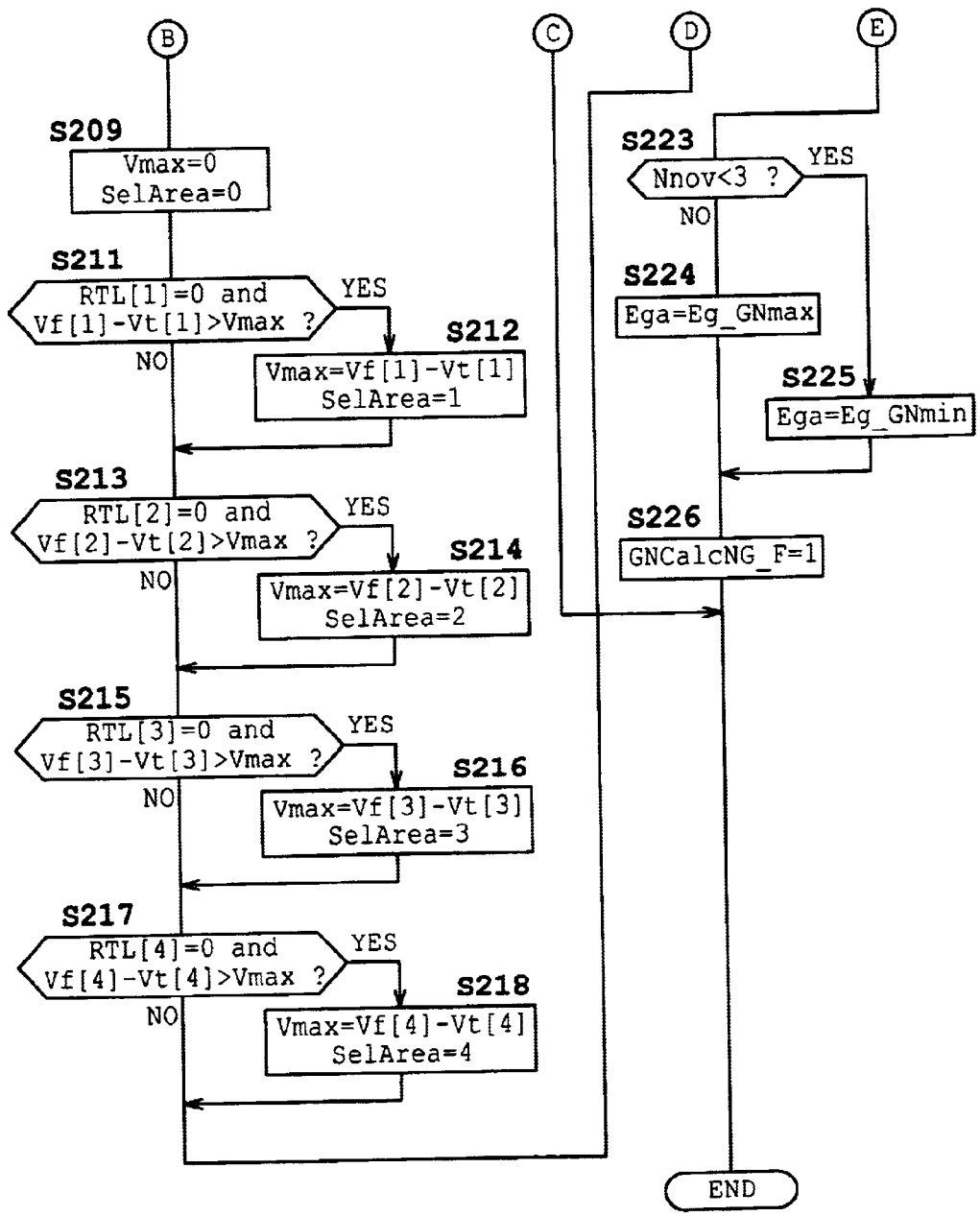
FIG. 18 is a flow chart showing the detailed process for correcting the monitor voltage, according to the first example.

Each of FIGS. 17 and 18 is a flowchart showing a first example of process for correcting or compensating the monitor voltage, which is executed at the step S200. In the first example, the final monitor voltage coefficient Ega is calculated, with the monitor output of the AF sensor 16 in a focussed area being taken as a standard. And in a case that the output in the focussed area is null, namely in a case that there is overflow of the output and/or there is no reflected light in the focussed area, the final monitor voltage coefficient Ega is calculated on the basis of an area having a maximum output.

In this process, it is determined whether each island is a focussing island or not, and it is determined whether there is no overflow of the output per island and there is a reflected light per island, or not. This determining operation is performed on the basis of the information upon the focussing area (refer to S46 in FIG. 10) having been determined at the multi-focus detection process, on the basis of the information of the RAM for the focussing area storage, and on the basis of the flag RTL(n) (refer to S153, S155, S157 and S159 in FIG. 16) for determining whether there is no overflow of the output per island and there is a reflected light per island, or not, in the process for determining whether the reflected light exits or not, shown in FIG. 16.

Firstly, at step S201 (see FIG. 17), it is determined whether Flna is 1 and the flag RTL (1) is 0, or not, in respect of the first island. If the condition is not satisfied at the step S201, it proceeds to the next step S203 where it is determined whether Flna is 2 and the flag RTL (2) is 0, or not, in respect of the second island. In the same way, if the condition is not satisfied, it proceeds to step S205 at which it is determined whether the same condition is satisfied or not in respect of the fourth island and to step S207 at which it is determined whether the same condition is satisfied or not in respect of the third island, in this order. By the way, the central area of the AF sensor 16 is composed of both of the second island and the fourth island, the determination processes of the second island and the fourth island, are performed successively, in this way.

On the other hand, if it is determined at each step S201, S203, S205, S207 that there exits a focussing area, that there is no overflow of the output, and that there exits a reflected light, it proceeds to step S202, S204, S206, S208 where the final monitor voltage coefficient(s) Ega(s) is/are calculated by employing the monitor output(s) of the island(s). The final monitor voltage coefficient Ega is calculated on the basis of the following equation (2).

$$Ega=\{Vf(n)-Vt(n)\}^{1/2}/\{C(n)*G(n)\} \qquad (2)$$

where C(n) indicates a voltage correction coefficient of the n-th island, and G(n) indicates a CCD gain correction coefficient of the same n-th island.

When the final monitor voltage coefficient Ega is calculated through the above steps S202, S204, S206 and S208, a guide number calculation NG flag (GNCaleNG_F) is set to be "0" (zero) in order to designate that the preparation for calculating the guide number is finished, at step S210, and then the process for correcting the monitor voltage comes to an end.

If there is not an island which satisfies the condition that the island corresponds to a focussing area and to the island in which there is no overflow of its output and in which there exists the reflected light, namely if the monitor output of the focussing area is overflown and/or there is no reflected light, the process for calculating the final monitor voltage coefficient Ega is executed on the basis of the output of the maximum output voltage area which corresponds to the island in which there is no overflow of the output.

In the process, the maximum monitor output is determined; namely, a particular island in which the difference between the monitor output gained at time of the available light and the monitor output gained at time of preliminary flash light becomes the maximum, is determined. For this process, the value of Vmax indicating the maximum monitor output value is reset to "0" (zero) as an initial value; and at the same time, a flag of SelArea indicating a particular island having the maximum monitor output is reset to be "0" (zero), at step S209.

Next, it is determined whether, in respect of the first island, RTL(L) is "0" (i.e. there is no overflow of the output in respect the first island) and the output is greater than the then value of the Vmax, at step S211. And, if the condition is satisfied, the then value of the Vmax is replaced by the new greater value, and at the same time "1" (one) is allocated to the flag of SelArea indicating an island having the maximum monitor output, at step S212.

By the way, the value of the initial Vmax is set to be equal to "0" (zero) (see S209). Therefore, if the RTL has a value of "0" (zero), the monitor output of the first island becomes the then value of the Vmax unconditionally. On the other hand, if the condition is not satisfied, the process in respect of the second island is performed successively.

At step S213, it is determined whether RTL(2) is equal to "0" (zero), and the monitor output is greater than the value of the Vmax determined at the preceding step(s) S211 and S212. If the condition is satisfied, the value of the Vmax is replaced by the new monitor output of the second island; at the same time, "2" (two) is inputted to the SelArea which is the flag indicating the maximum monitor output, at step S214. On the other hand, if the condition is not satisfied, it proceeds to the next process for the third island.

That is, if the condition is not satisfied, the same determining processes are executed in respect of the third and fourth islands at steps S215 and S217. Meanwhile, if the condition is satisfied, the values of the Vmax and SelArea are inputted at steps S216 and S218.

Up to this step S218, a particular island having the maximum monitor output is indicated by the value of the selArea. Then, the values of the SelArea are determined at the following steps S219, S220, S221 and S222 (see FIG. 17).

If the value of the SelArea is not "0" (zero), the final monitor voltage coefficient Ega is calculated by making use of the monitor output of the island having the same value of the SelArea, at steps S202, S204, S206 and S208.

When the final monitor voltage coefficient Ega has been calculated through these steps, "0" (zero) is inputted to the guide number calculation NG flag (GNCalcNG_F) in order to show that it is possible to calculate the guide number; and then the process for correcting, or compensating, the monitor voltage is finished.

On the other hand, if the value of the Vmax and the value of the SelArea are not rewritten through the steps S211 to S218, the value of Vmax remains as being equal to "0" (zero) and the value of SeLArea remains as being equal to "0" (zero), as set at the step S209. Namely, if the value of SelArea is equal to "0" (zero) at each of steps S219 to S222, it means that there is no island having the maximum monitor output; in other words, it is not possible to calculate the final monitor voltage coefficient Ega on the basis of the equation (2). In this case, the final monitor voltage coefficient Ega is determined by performing the following steps.

Firstly, at step S223 (see FIG. 18), it is determined whether the value of the flag Nnov indicating the number of area in which there is no overflow, is less than 3, in which the value of the flag Nnov has already been determined at the preceding steps shown in FIG. 15.

If it is determined that the value of the flag Nnov is equal to 3, namely if the outputs are overflown in all the areas, the maximum guide number control is performed. That is, a voltage coefficient Eg_GNmax for a predetermined maximum guide number control is employed as the final monitor voltage coefficient Ega, at step S224.

On the other hand, if it is determined that the value of the flag Nnov is less than 3, namely if the output(s) is/are overflown in at least more than one area, the minimum guide number control is performed. That is, a voltage coefficient Eg_GNmin for a predetermined minimum guide number control is employed as the final monitor voltage coefficient Ega, at step S225.

Finally, at step S226, "1" (one) is inputted, or allocated, to a guide number calculation NG flag (GNCalcNG) in order to indicate that the final monitor voltage coefficient Ega can not be calculated or that the guide number for the main flash light emission can not be calculated; and then the process is finished.

(Second Example for Correcting Monitor Voltage)

Figure 19:
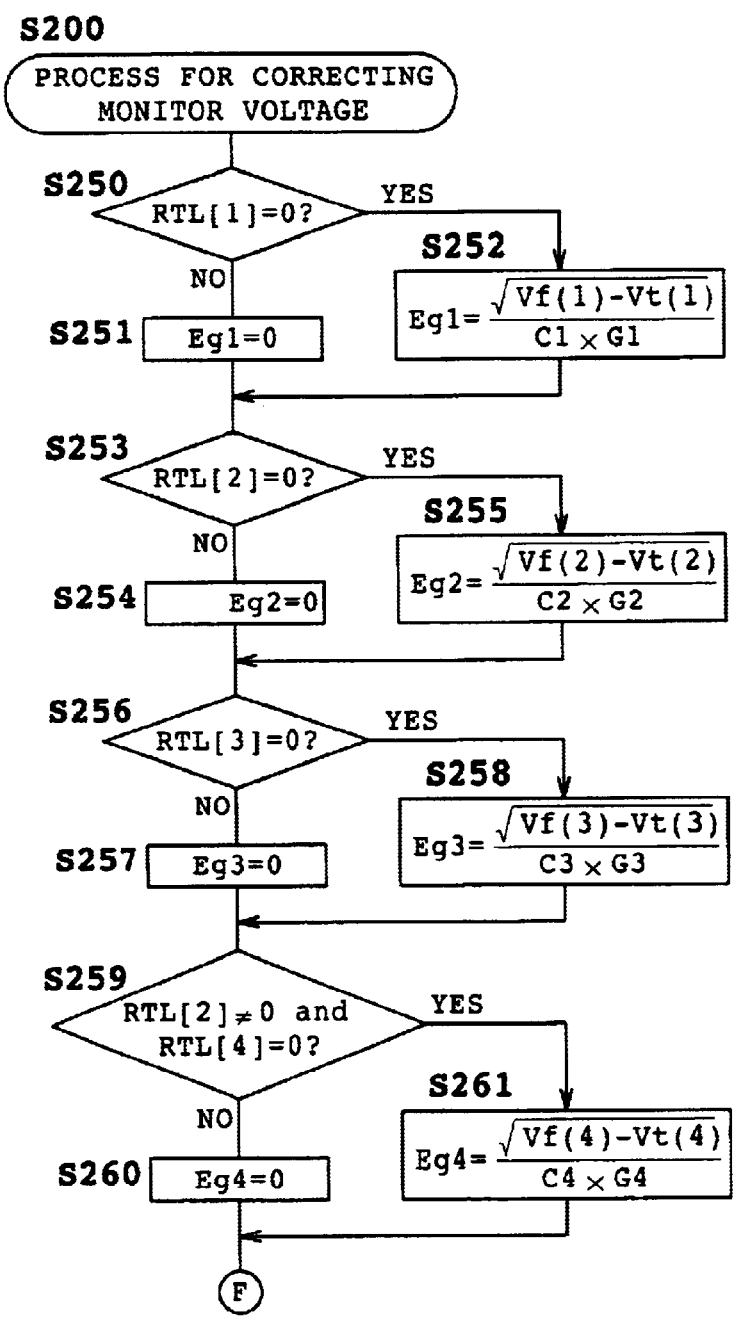
FIG. 19 is a flow chart showing a detailed process for correcting the monitor voltage, according to a second example.
Figure 20:
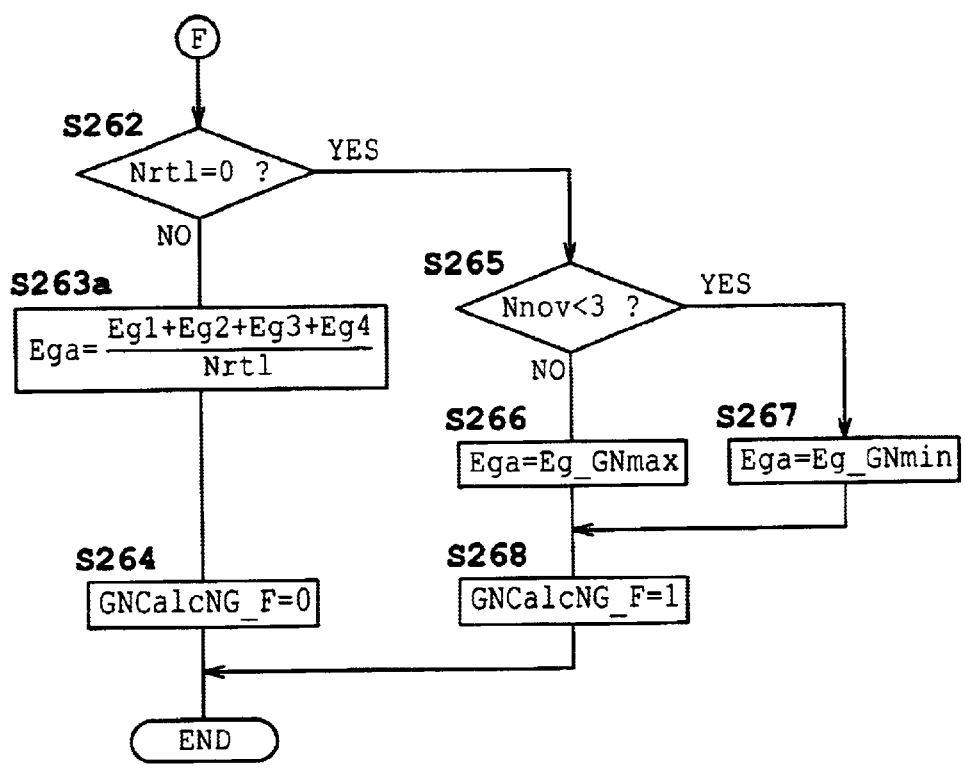
FIG. 20 is a flow chart showing the detailed process for correcting the monitor voltage, according to the second example.

Each of FIGS. 19 and 20 is a flowchart showing a second example of process for correcting or compensating the monitor voltage, which is executed at the step S200. In the second example, the final monitor voltage coefficient Ega employed at time of the main flash light emission is calculated, by taking (or calculating) the weighted average (or weighted mean) of the monitor outputs in the areas from which only effective outputs are gained.

In the second example, it is determined whether there is no overflow of the output and there is a reflected light per island, or not; and the value of the final monitor voltage coefficient Ega is calculated per island. That is, at step S200, it is determined whether there is any effective monitor output or not, on the basis of the RTL per island having been determined in the process for determining whether the reflected light exists or not (see FIG. 16).

Firstly, at step S250, it is determined whether RTL(1) is equal to "0" (zero) or not in respect of the first island; in other words, it is determined whether there is no overflow of the monitor output and there is a reflected light, in the first island, or not. If it is determined that RTL(1) is not equal to "0" (zero), the voltage coefficient Eg1 of the first island is set to be "0" (zero), at step S251.

On the other hand, if it is determined that RTL(1) is equal to "0" (zero), namely if there is an effective monitor output of the first island, the voltage coefficient Eg1 of the first island is calculated at step S252 on the basis of the following equation (3).

$$Egn = \{Vf(n) - Vt(n)\}^{1/2} / (Cn * Gn) \quad (3)$$

In the above equation (3), Cn indicates a voltage correction coefficient of the n-th island, and Gn indicates a CCD gain correction coefficient of the n-th island.

In the same way, the same determining processes are performed in respect of the second, third and fourth islands at steps S253, S256 and S259; and the voltage coefficient of each island is determined at steps S254, S255, S257, S258, S260 and S261. In respect of the fourth island, however, the voltage coefficient is determined in step S261 only when it is determined that the second island has no effective monitor output, at step S259. Namely, in respect of the monitor coefficient Egn of the islands (i.e. the second island and the fourth island) locating the central area of the AF sensor 16, either one of them is employed.

Once the value of the voltage coefficient Egn per island is determined in this way, as shown in FIG. 20, only the voltage coefficient(s) of the area(s) in each of which there is no overflow of the monitor output and in each of which there is a reflected light, is/are added up, so that the final monitor voltage coefficient Ega is calculated.

Namely, firstly, at step S262, it is determined whether Nrtl indicating the number of area in which there is no overflow of the monitor output and in which there is the reflected light, is equal to "0" (zero) or not, in which the value of Nrtl has been already determined in the preceding process (refer to FIG. 16) for determining whether there exists a reflected light or not. If the value of the Nrtl is not equal to "0" (zero), the voltage coefficient(s) of the islands sought for in the aforementioned steps are added up, and then the value of the addition thereof is divided by the value of Nrtl (i.e. divided by the number of area(s) in which there exist(s) effective monitor output(s)), thus gaining the value of the final monitor voltage coefficient Ega as an average of the island (s), at step S263a.

Next, it proceeds to step S264 where "0" (zero) is inputted to a guide number calculation NG flag (GNCalcNG_F) in order to indicate that the preparation for calculating the guide number is accomplished; and then the process for correcting the monitor voltage is finished.

On the other hand, if it is determined that the value of Nrtl is equal to "0" (zero) at the step S262, namely if the monitor output from each island corresponds to overlow or no reflected light, the final monitor voltage coefficient Ega is made to vary, depending upon the number of the island(s) in each of which there is a overflow of the monitor output.

Firstly, at step S265, it is determined whether the value of a flag of Nnov indicating the number of the area(s) in each of which there is no overflow of the output is less then three or not, in which the value of Nnov has been already determined in the aforementioned overflow determining process shown in FIG. 15.

If the value of Nnov is equal to three, namely if there is no overflow in each area, a maximum guide number control is executed at step S266. Namely, at the same step, a predetermined voltage coefficient Eg_GNmax for the maximum guide number control is employed as the final monitor voltage coefficient Ega, at step S266.

On the other hand, if it is determined at the step S265 that the value of Nnov is less then three, namely if there is an overflow of the output in at least one area, the minimum guide number control is executed. That is, a predetermined voltage coefficient Eg_GNmin for the minimum guide number control is employed as the final monitor voltage coefficient Ega, at step S267.

Finally, "1" (one) is inputted to the guide number calculation NG flag (GNCalcNG_F) in order to designate that the final monitor voltage coefficient Ega can not be calculated and that the guide number for the main flash light emission can not be sought for, at step S268. Then the process is finished.

(Third Example for Correcting Monitor Voltage)

Figure 21:
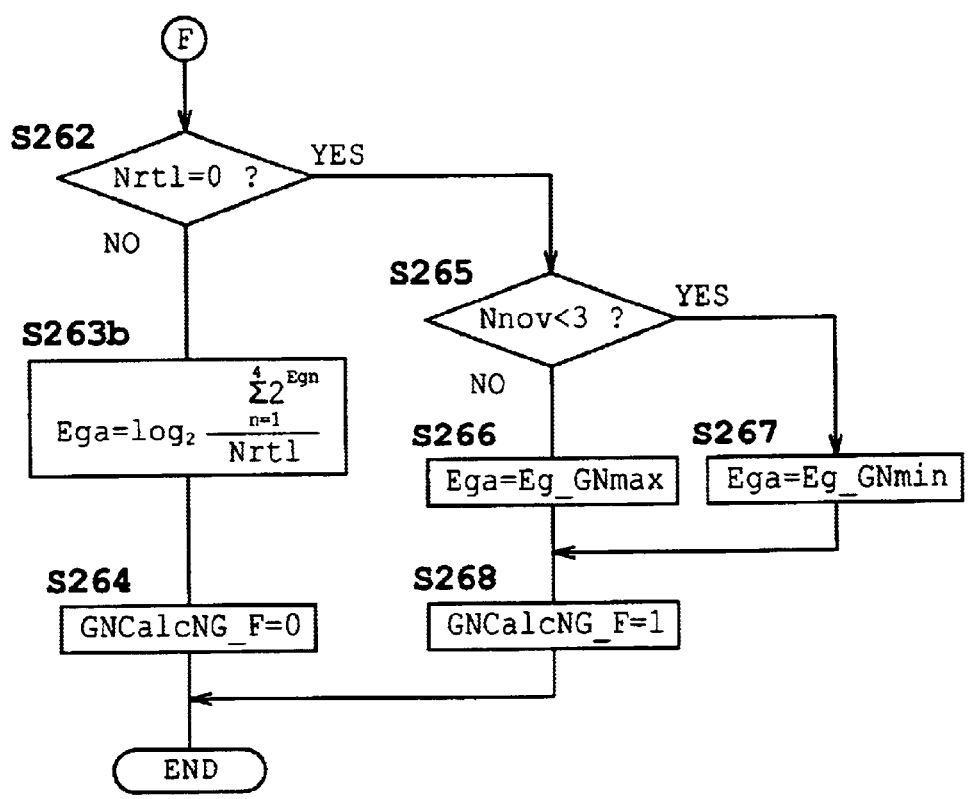
FIG. 21 is a flow chart showing a detailed process for correcting the monitor voltage, according to a third example.

Next, it is explained about a third example of the monitor voltage correction process. FIG. 21 is a flowchart showing the third example of the process for correcting or compensating the monitor voltage, which is executed at the step S200 (see FIG. 19). In the third example, the final monitor voltage coefficient Ega employed at time of the main flash light emission is calculated, by taking (or calculating) the exponential average of the monitor outputs in the areas from which only effective outputs are gained. In the third example, it is determined whether there is no overflow of the output and there is a reflected light per island, or not, in the same way as that of the second example for correcting monitor voltage (refer to steps S250 to S261 in FIG. 19). In the third example, the final monitor voltage coefficient Ega, is calculated with a greater weight being put on a greater monitor output. Namely, when the monitor output is greater, or when the final monitor voltage coefficient Ega is calculated with a priority being given to a closer object to be photographed, the process according to the third example is advantageous.

When the value of the voltage coefficient Egn per island is determined in accordance with the same procedure (refer to steps S250 to S261 in FIG. 19) as that of the second example as described above, the final monitor voltage coefficient Ega is calculated, by taking the exponential average of only the monitor outputs in the areas in each of which there is no overflow of the output and in each of which there is a reflected light, as shown in FIG. 21. That is, it is determined whether the value of Nrtl indicating the number of the area in which there is no overflow thereof and in which there is a reflected light, is equal to "0" (zero) or not, at S262, in which the value of Ntrl is determined in the aforementioned process for determining whether there exists a reflected light or not. If it is determined that the value of Nrtl is not equal to "0" (zero) at step S262, the final monitor voltage coefficient Ega is calculated on the basis of an equation (4), at step S263b.

$$Ega = \log_2 \left\{ \left( \sum_{n=1}^{4} 2^{Egn} \right) / Nrtl \right\} \quad (4)$$

Next, it proceeds to step S264 where "0" (zero) is inputted to a guide number calculation NG flag (GNCalcNG_F) in order to indicate that the preparation for calculating the guide number is accomplished, and then the process for correcting the monitor voltage is finished.

On the other hand, if it is determined that Nrtl is equal, to "0" (zero) at step S262, namely if the monitor output from each island is overflown and/or if there is no reflected light, the final monitor voltage coefficient Ega is made to vary, depending upon the number of the island(s) in each of which there is an overflow of the output.

That is, at step S265, it is determined whether the flag Nnov indicating the number of the area in which there is no overflow of the output is less then 3 or not, in which the value of Nnov has been already determined in the aforementioned overflow determination process shown in FIG. 15.

If it is determined at step S265 that the flag Nnov is equal to "3", namely if each of all the areas is not overflown in the output, the maximum guide number control is executed at S266. That is, a predetermined voltage coefficient Eg_GNmax for the maximum guide number control is employed, as the final monitor voltage coefficient Ega.

If it is determined at the same step S265 that the flag Nnov is less than "3", namely if at least one area is overflown in the output, the minimum guide number control is executed at step S267. That is, a predetermined voltage coefficient Eg_GNmin for the minimum guide number control is employed, as the final monitor voltage coefficient Ega.

Finally, "1" (one) is inputted to the guide number calculation NG flag (GNCalcNG_F) in order to designate that the final monitor voltage coefficient Ega can not be calculated and that the guide number for the main flash emission can not be sought for, at step S268. Then the process or operation is finished.

(Fourth Example for Correcting Monitor Voltage)

Figure 22:
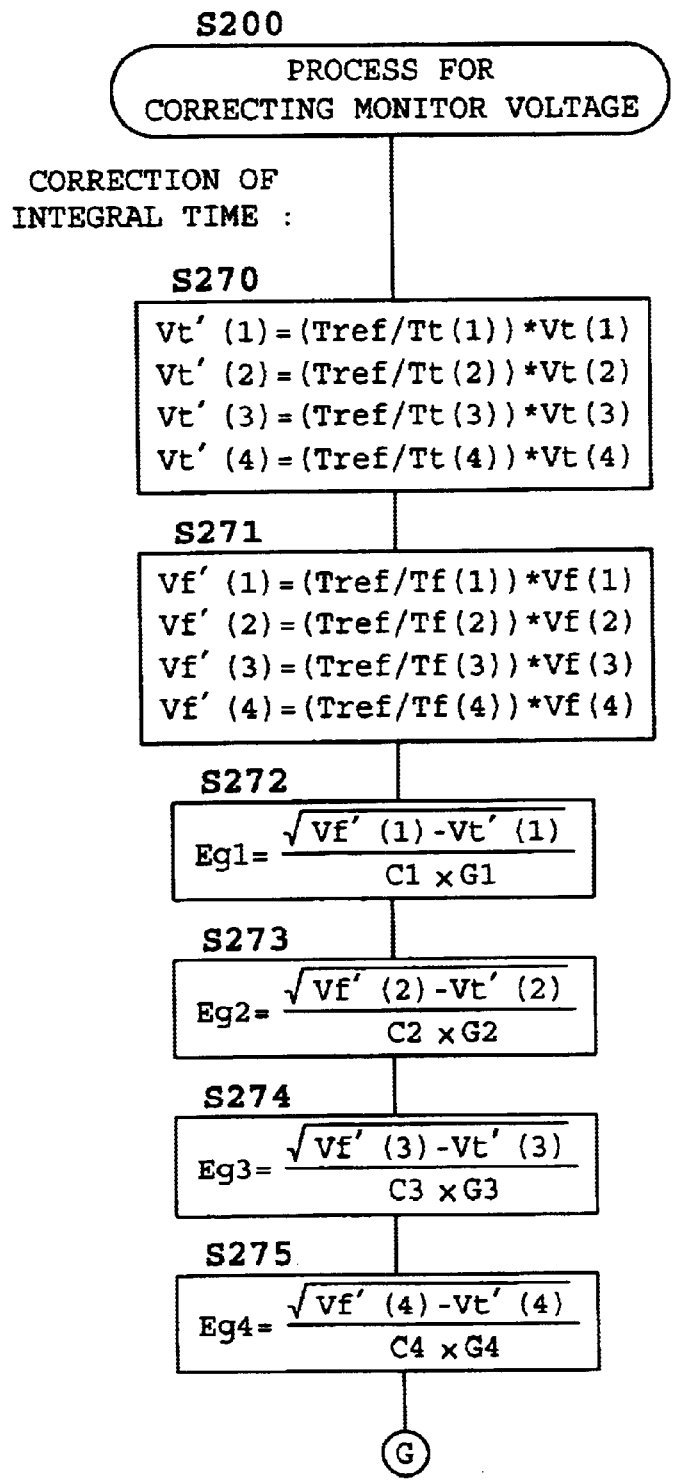
FIG. 22 is a flow chart showing a detailed process for correcting the monitor voltage, according to a fourth example.
Figure 23:
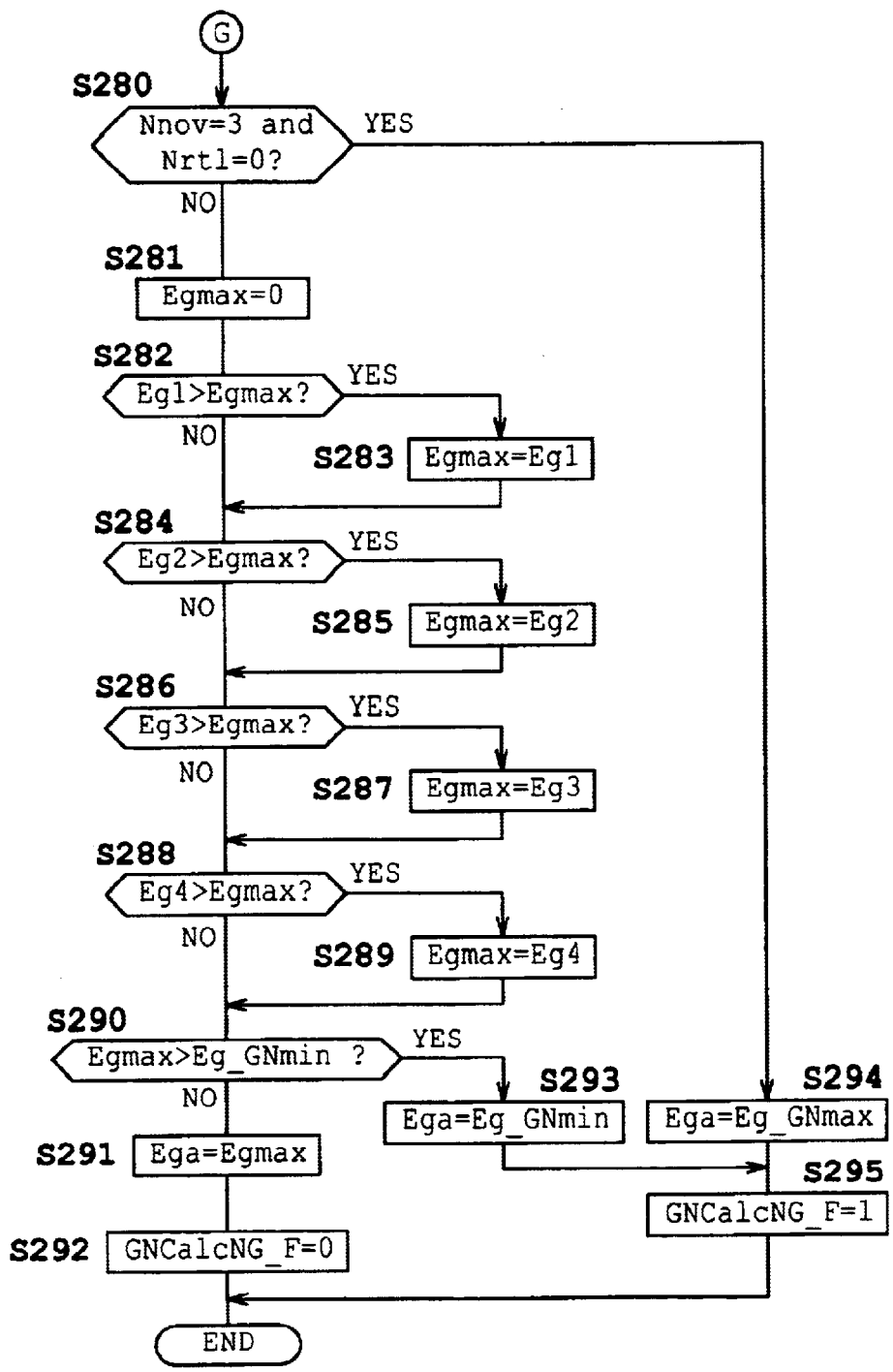
FIG. 23 is a flow chart showing the detailed process for correcting the monitor voltage, according to the fourth example.

Next, it is explained about a fourth example for correcting the monitor voltage. Each of FIGS. 22 and 23 is a flowchart showing the fourth example of the process for correcting or compensating the monitor voltage, which is executed at the step S200. In the fourth example, the monitor output from the island in which there is an overflow, is corrected or compensated by employing time V0 which is integrated actually, an output maximum area is selected by employing the corrected or compensated monitor output, and the final monitor voltage coefficient Ega is calculated.

That is, the time for performing the integral per island at time of the available light, is corrected or compensated at step S270. That is, the monitor output Vt'(n), in the corrected integral time, which is calculated by the ratio of a predetermined integral time Tref (2 ms) to the integral time Tt(n) per island at time of the available light being multiplied by the monitor output voltage Vt(n) at time of the available light, is calculated, at step S270. In other words, on the assumption that the electrical charge integral is performed per island over a saturated integral time, and on condition that the integral time and the stored electrical charge (or accumulated electrical charge) are proportional to each other, the monitor output Vt'(n) over the corrected integral time is hypothetically calculated, about what value the voltage Vt(n) as the monitor output has.

Next, at step S271, the integral time at time of the preliminary flash light emission is corrected or compensated per island. That is, concerning the monitor output at time of the preliminary flash light emission, the monitor output Vf'(n) is calculated with the corrected integral time, in the same way as that employed in the above step S270.

Next, at step S272, employing the monitor outputs Vt'(n) and Vf'(n) gained in the above steps S270 and S271, the voltage coefficient Egn is calculated per island, on the basis of the following equation (5), at steps S272 to S275.

$$Egn = \{Vf'(n) - Vt'(n)\}^{1/2}/(Cn*Gn) \quad (5)$$

In the above equation (5), Cn is a voltage correction coefficient of the n-th island, and Gn is a CCD gain correction coefficient of the n-th island.

Next, as shown in FIG. 23, employing the maximum value of all the values of Egn having been calculated at the aforementioned steps S272 to S275, the final monitor voltage coefficient Ega is calculated.

That is, at step S280, it is determined whether Nnov indicating the number, sought in the overflow determination process (refer to FIG. 15), of the area(s) in each of which there is no overflow of the output, is equal to "3", and Nrtl indicating the number, sought in the process (refer to FIG. 16) for determining whether the reflected light exists or not, of the areas in each of which there is no overflow and in each of which there is a reflected light, is equal to "0" (zero), or not. That is, at this step, in respect of each of the monitor outputs of all the three areas, it is determined whether the difference between the monitor output at time of the available light and the monitor output at time of the preliminary flash light emission, exceeds the threshold value Th, or not.

If it is determined at the same step that the condition is satisfied, the maximum guide number control is performed. In other words, the predetermined voltage coefficient (Eg_GNmax) for the maximum guide number control is employed, as the final monitor voltage coefficient Ega, at step S294. Then, in order to designate that the final monitor voltage coefficient Ega can not be calculated and that the guide number for the main flash light emission can not be sought for, "1" (one) is inputted to the guide number calculation NG flag (GNCalcNG_F), at step S295. Then the process is finished.

On the other hand, if it is determined at step S280 that the aforementioned condition (Nnov=3 and Nrtl=0) is not satisfied, the process for selecting a particular area providing the maximum output is started. Namely, firstly, the value of Egmax is reset to be "0" (zero), at step S281. Subsequently, it is determined per island whether the value of Egn (i.e. Eg1, Eg2, Eg3 and Eg4) having been calculated at the preceding step exceeds the value of Egmax, or not.

That is, at step S282, regarding the first island, it is determined whether the value of Eg1 sought at the above step S272 is greater than Egmax, or not. If it is determined that value thereof is greater than the Egmax, the value of Egmax is replaced with the value of the Eg1, at step S283.

In the same way, regarding the second, third and fourth islands, the comparison between the value of the Egn and the value of the Egmax is made, at steps S284, S286 and S288. If the then value of Egn is greater than the then value of the Egmax, then the value of the Egmax is replaced by the value of the Egn, at steps S285, S287 and S289.

When the maximum voltage coefficient of all the voltage coefficients of the islands is determined in this way, it is determined whether the value of the Egmax is greater than the predetermined voltage coefficient, Eg_GNmin, for the minimum guide number control, or not, at step S290. If it is determined that the value of the Egmax is greater than the predetermined voltage coefficient, Eg_GNmin, the predetermined voltage coefficient Eg_GNmin for the minimum guide number control is adopted, at step S293. Then, in order to designate that the final monitor voltage coefficient Ega can not be calculated and that the guide number for the main flash light emission can not be sought for, "1" (one) is inputted to the guide number calculation NG flag, GNCalcNG_F, at step S295; and then the process is finished.

On the other hand, if it is determined at step S290 that the value of the Egmax is smaller than the value of Eg_GNmin, the value of the Egmax is adopted as the value of the final monitor voltage coefficient Ega, at step S291. Then, in order to designate that the preparation for calculating the guide number is accomplished, "0" (zero) is inputted to the guide number calculation NG flag, GNCalcNG, at step S292; and then the process for correcting the monitor voltage is finished.

(Fifth Example for Correcting Monitor Voltage)

Figure 24:
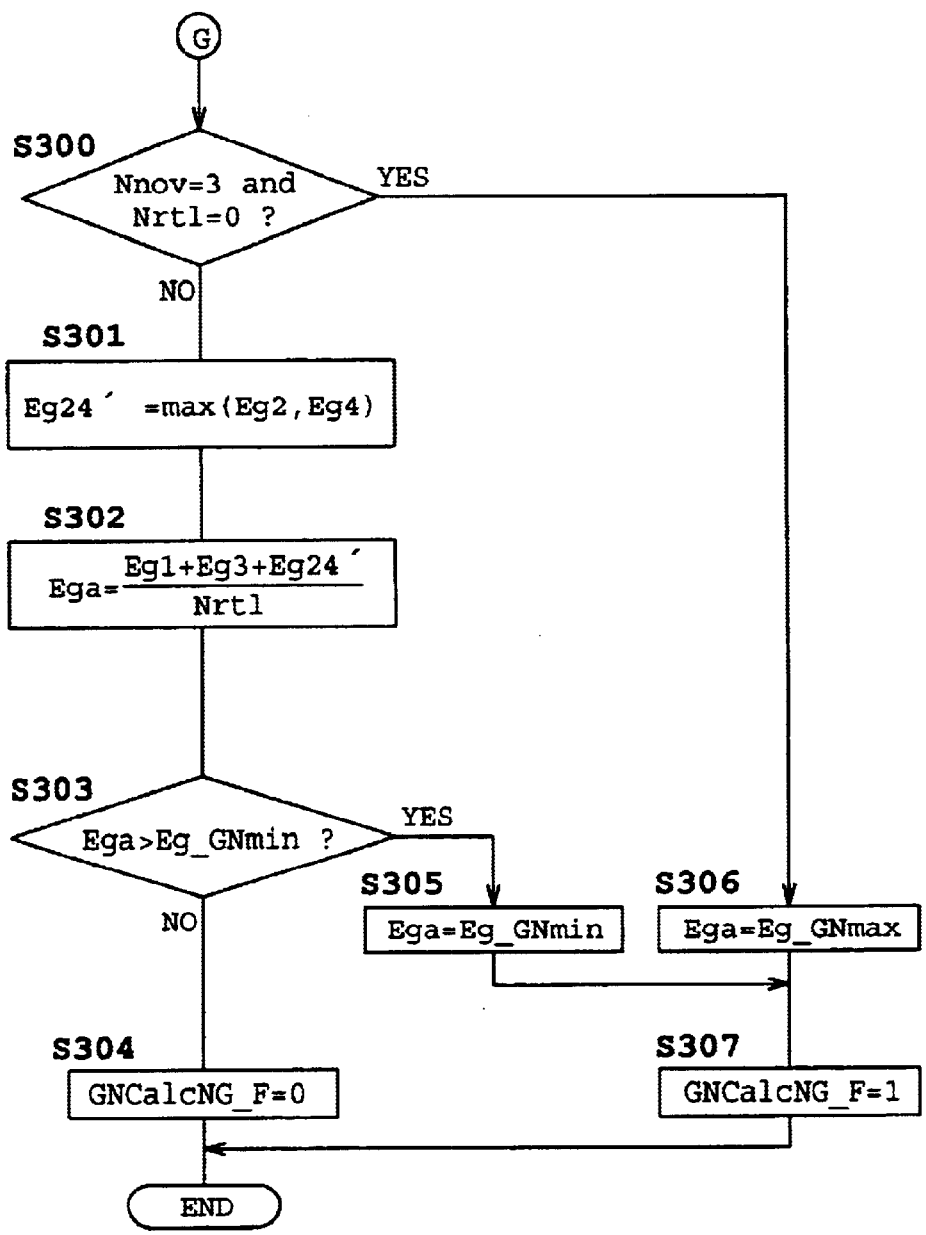
FIG. 24 is a flow chart showing a detailed process for correcting the monitor voltage, according to a fifth example.

Next, it is explained about the fifth example for correcting the monitor voltage. FIG. 24 is a flowchart showing a fifth example of the process for correcting or compensating the monitor voltage, which is executed at the step S200. In the fifth example, the monitor output of an island in which there is an overflow of the monitor output, is corrected or compensated by employing the time V0 actually integrated; at the same time, the final monitor voltage coefficient Ega is calculated by taking a weighed average (weighed mean) of the voltage coefficients which are calculated on the basis of the corrected monitor outputs.

According to this example, the correction or compensation of the output of the island in which there is the overflow of the output, and the process for calculating the voltage coefficient of each island, are done in the same way as those of the fourth example for correcting monitor voltage (refer to steps S270 to S275 in FIG. 22).

Next, at step S300, it is determined whether Nnov indicating the number, sought in the overflow determination process (refer to FIG. 15), of the area in which there is no overflow of the output, is equal to "3", and Nrtl indicating the number, sought in the process (refer to FIG. 16) for determining whether the reflected light exists or not, of the area in which there is no overflow and in which there is a reflected light, is equal to "0" (zero), or not. That is, at this step, in respect of each of the monitor outputs of all the three areas, it is determined whether the difference between the monitor output at time of the available light and the monitor output at time of the preliminary flash light emission, exceeds the threshold value Th, or not.

If it is determined at the same step S300 that the condition is satisfied, the maximum guide number control is performed. In other words, the predetermined voltage coefficient, Eg_GNmax, for the maximum guide number control is employed, as the final monitor voltage coefficient Ega, at step S306. Then, in order to designate that the final monitor voltage coefficient Ega can not be calculated and that the guide number for the main flash light emission can not be sought for, "1" (one) is inputted to the guide number calculation NG flag, GNCalcNG_F, at step S307; and then the process is finished.

On the other hand, if it is determined at step S300 that the above condition (i.e. Nnov=3 and Nrtl=0) is not satisfied, it proceeds to step S301 where it is determined which one of the outputs from the second island and the fourth island is greater. Subsequently, it proceeds to step S302 where the weighted average (weighted mean) of the result (Eg24'=max (Eg2, EG4)) gained at the step S301 and the voltage coefficients Eg1+Eg3 of the other islands (i.e. 1st and 3rd islands), is taken (or is calculated), at step S302. The result of the calculation is adopted or employed as a temporary (or provisional) final monitor voltage coefficient Ega.

When the temporary coefficient Ega is sought for, it is determined at step S303 whether the value of the Ega is greater than the predetermined voltage coefficient Eg_GNmin for the minimum guide number control. If it is determined at the same step S303 that the value of the Ega is greater than the value of the coefficient Eg_GNmin, then the value of the coefficient Eg_GNmin for the minimum guide number control is employed as the value of the final monitor voltage coefficient Ega, at step S305. Then, in order to designate that the final monitor voltage coefficient Ega can not be calculated and that the guide number for the main flash light emission can not be sought for, "1" (one) is inputted to the guide number calculation NG flag, GNCalcNG_F, at step S307; and then the process is finished.

On the other hand, if it is determined at the above step S303 that the value of the Ega is smaller than the value of the coefficient Eg_GNmin, it proceeds to step S304 where the temporary value of the Ega is employed as the final monitor voltage coefficient Ega. Then, in order to designate that the preparation for calculating the guide number is accomplished, "0" (zero) is inputted to the guide number calculation NG flag, GNCalcNG_F, at the step S304; and then the process for correcting the monitor voltage is finished.

(Sixth Example for Correcting Monitor Voltage)

Figure 25:
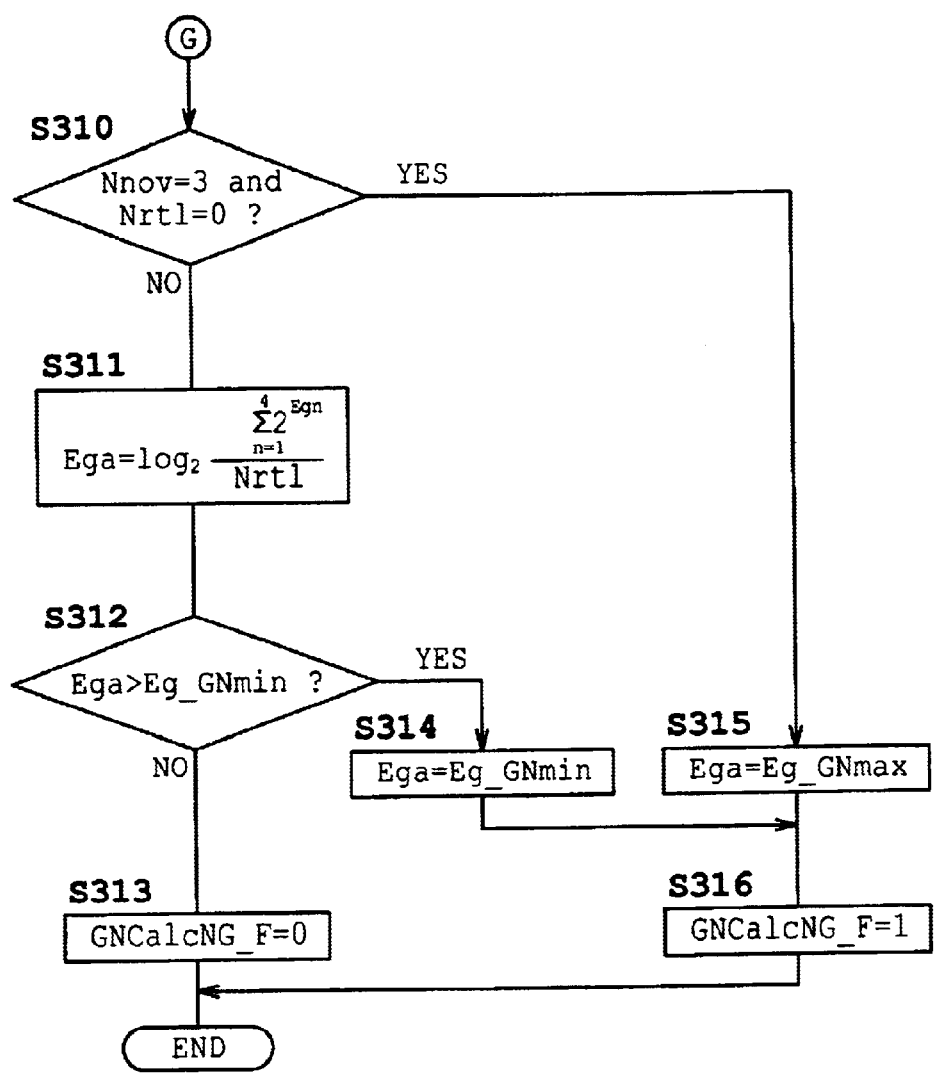
FIG. 25 is a flow chart showing a detailed process for correcting the monitor voltage, according to a sixth example.

Next, it is explained about the sixth example for correcting the monitor voltage. FIG. 25 is a flowchart showing a sixth example of the process for correcting or compensating the monitor voltage, which is executed at the step S200. In the sixth example, the monitor output of an island in which there is an overflow of the monitor output, is corrected or compensated by employing the time V0 actually integrated; at the same time, the final monitor voltage coefficient Ega is calculated by taking an exponential average of the outputs from all the areas.

According to this example, the correction or compensation of the output of the island in which there is an overflow of the output, and the process for calculating the voltage coefficient of each island are done in the same way as those of the fourth example for correcting monitor voltage (refer to steps S270 to S275 in FIG. 22).

Next, at step S310, it is determined whether Nnov indicating the number, sought in the overflow determination process (refer to FIG. 15), of the area(s) in which there is no overflow of the output, is equal to "3", and Nrtl indicating the number, sought in the process (refer to FIG. 16) for determining whether the reflected light exists or not, of the area(s) in which there is no overflow and in which there is a reflected light, is equal to "0" (zero), or not. That is, at this step, in respect of each of the monitor outputs of all the three areas, it is determined whether the difference between the monitor output at time of the fixed light and the monitor output at time of the preliminary flash light emission, exceeds the threshold value Th, or not.

If it is determined at the same step S310 that the condition is satisfied, the maximum guide number control is performed. In other words, the predetermined voltage coefficient, Eg_GNmax, for the maximum guide number control is employed, as the final monitor voltage coefficient Ega, at step S315. Then, in order to designate that the final monitor voltage coefficient Ega can not be calculated and that the guide number for the main flash light emission can not be sought for, "1" (one) is inputted to the guide number calculation NG flag, GNCalcNG_F, at step S316; and then the process is finished.

On the other hand, if it is determined at the above step S310 that the above condition (i.e. Nnov=3 and Nrtl=0) is not satisfied, the exponential average of the voltage coefficients Egn of all the islands is taken or calculated at step S311. Then, the result of the calculation is adopted as a temporary (or provisional) final monitor voltage coefficient Ega.

After the temporary final monitor voltage coefficient Ega is determined at the step S311, it is determined at step S312 whether the value of the Ega is greater than the predetermined voltage coefficient, Eg_GNmin, for the minimum guide number control. If it is determined at same step S312 that the value of the Ega is greater than the value of the Eg_GNmin, the predetermined voltage coefficient, Eg_GNmin, for the minimum guide number control is employed as the final monitor voltage coefficient Ega, at step S314. Then, in order to designate that the final monitor voltage coefficient Ega can not be calculated and that the guide number for the main flash light emission can not be sought for, "1" (one) is inputted to the guide number calculation NG flag, GNCalcNG_F, at step S316; and then the process is finished.

On the other hand, if it is determined at the above step S312 that the value of the Ega is smaller than the value of the Eg_GNmin, the above temporary value of the Ega is adopted as the final monitor voltage coefficient Ega. Then, in order to designate that the preparation for calculating the guide number is accomplished, "0" (zero) is inputted to the guide number calculation NG flag, GNCalcNG_F, at step S313; and then the monitor voltage correction process is finished.

In this way, the final monitor voltage coefficient Ega gained, or calculated, by the monitor voltage correction process according to each of the aforementioned first through six examples, is employed for calculating the guide number for the main flash light emission, at step S350, as shown in FIG. 14.

By the way, if either one of the aforementioned monitor voltage correction processes according to the above first through sixth examples, is performed in the process for the photographing operation according to the second modification shown in FIG. 8 or to the third modification shown in FIG. 9, and if "1" (one) is inputted to the guide number calculation NG flag, GNCalcNG_F, in order to designate that the guide number for the main flash light emission can not be calculated, the process for calculating the amount of the main flash light emission proceeds as follows. Namely, under the condition, when the preliminary flash light emission is the first one, then the preliminary flash light is emitted again; on the other hand, when the preliminary flash light emission is the second one, then the amount of the main flash light is calculated by employing the final monitor voltage coefficient having been sought for at time of the second preliminary flash light emission.

(Main Flash Light Emission Control)

Figure 26:
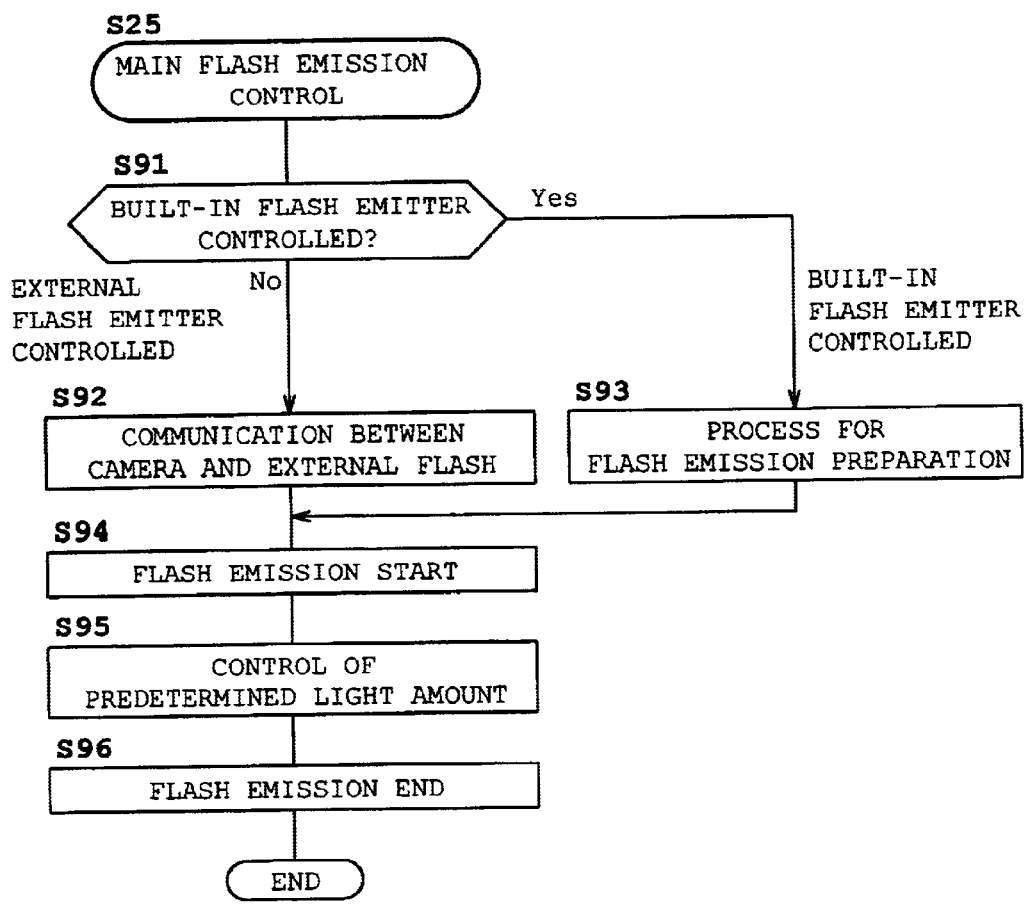
FIG. 26 is a flow chart showing a process for executing a control of the main flash light emission.

FIG. 26 is a flow chart showing a process for controlling the main flash light emission (see S25 in FIG. 5). Firstly, at step S91, it is determined whether the flash device is the external flash device 4 (see FIG. 1) or the built-in flash device 4a (see FIG. 2).

When the external flash device 4 is employed, it proceeds to step S92 where the side of the camera body 2 and the side of the flash device 4 communicate with each other at step S92 and where the guide number (light emission amount) for the main flash light emission calculated by employing the final monitor voltage coefficient Ega having been sought for at the aforementioned monitor voltage correction process is set. On the other hand, when the preliminary flash light is emitted by the built-in flash device 4a, the CPU 11 of the camera body 2 transmits the guide number (light emission amount) for the main flash light emission to the flash control module 26, in order to prepare the process for emitting the main flash light, at step S93.

When the preparation for the process for emitting the main flash light is finished, the emission of the main flash light starts at step S94.

Then, at step S95, the flash control module 26 controls the amount of the main flash light emission in accordance with the guide number for the main flash light emission.

Then, when the amount of the main flash light emission reaches the predetermined amount thereof, the emission of the main flash light is ended at step S96.

As explained above, according to the arrangement of the camera of the embodiment, the AF sensor is also employed as a sensor for flash light adjustment. Therefore, it is possible to reduce the number of parts constituting the camera.

Also, according to the arrangement thereof, prior to the main flash light emission, the flash light is emitted preliminarily, and on the basis of the results thereof, emission amount, that is, the guide number for the main flash light emission is determined. Therefore, the construction or mechanism for leading the light of an object (or subject) to be photographed, to the AF sensor, is simplified.

Also, according to the arrangement thereof, even if the range from maximum to minimum signal levels that the AF sensor can integrate is small, it is possible to accurately calculate the amount of light of the main flash light emission, by selecting and adopting the monitor output for adjusting the light.

Although the present invention has been fully described in connection with the preferred embodiment thereof with reference to the accompanying drawings, it is to be noted that various other changes and modifications are also apparent to those skilled in the art.

For example, in the aforementioned embodiment, the method for controlling the flash light photography applies to the single-lens reflex camera having a main mirror, in which a silver halide film is employed. However, the method therefor is not limited to the application to the single-lens reflex camera. For example, the method can apply to a single-lens reflex type of digital camera. Generally, in most of the single-lens reflex type thereof, image sensor for photographing are employed as auto-focus AF sensors; and part of the image taking elements can be employed as the AF sensor(s) and as the sensor(s) for controlling the light adjustment.

Such changes and modifications are to be understood as included within the scope of the present invention as defined by the appended claims unless they depart therefrom.

What is claimed is:

1. A camera using a flash emitter for emitting a flash light towards an object to be photographed, said camera comprising:
   a multi-AF sensor having a plurality of detection areas for receiving a reflected light, passing through a photographing lens, from the object, in which each of the detection areas outputs a signal;
   an AF controller for determining a detection area of the detection areas as a focus area on a basis of the signal outputted from the each of the detection areas of the multi-AF sensor;
   a selector for selecting a detection area of the detection areas as an optimum area which is most suitable for photographing the object, on a basis of the signal outputted from the each of the detection areas of the multi-AF sensor, in which the signal outputted from the each thereof corresponds to the reflected light from the object on a basis of a preliminary flash light emission made by the flash emitter prior to a main flash light emission made by the flash emitter; and
   a controller for determining an amount of flash light emission made by the flash emitter at time of the main flash light emission, on a basis of the signal outputted from the optimum area selected by the selector.

2. The camera as claimed in claim 1, wherein the selector selects the focus area determined by the AF controller, as the optimum area.

3. The camera as claimed in claim 1, wherein the selector has a determinator for determining whether the signal outputted from the multi-AF sensor includes an effective value which is capable of determining the amount of the flash light emission made by the flash emitter at time of the main flash light emission.

4. The camera as claimed in claim 3, wherein the selector selects the detection area outputting the signal with a maximum value which the determinator determines to include the effective value, as the optimum area.

5. The camera as claimed in claim 3, wherein the controller determines the amount of the main flash light emission made by the flash emitter, on a basis of an average of values of signals, each of which is the signal, which are outputted from the detection areas outputting the signals which the determinator determines to include effective values, each of which is the effective value.

6. The camera as claimed in claim 3, wherein the controller sets the amount of the main flash light emission made by the flash emitter to be a predetermined amount, when the determinator determines that each of signals outputted from the detection areas does not include the effective value.

7. The camera as claimed in claim 3, wherein when the determinator determines that the signal outputted from the multi-AF sensor does not include the effective value which is capable of determining the amount of the flash light emission made by the flash emitter at time of the main flash light emission, the determinator distinguishes between a state in which there is an overflow of the signal and a state in which there is not the reflected light.

8. The camera as claimed in claim 7, wherein when the determinator determines that each of signals outputted from the detection areas of the multi-AF sensor is in the state of the overflow, the controller sets the amount of the main flash light emission made by the flash emitter to be a minimum amount.

9. The camera as claimed in claim 7, wherein when the determinator determines that each of signals outputted from the detection areas of the multi-AF sensor is in the state of the overflow, the controller determines the amount of the main flash light emission made by the flash emitter, on a basis of an estimated value of stored electrical charge which is calculated on a basis of integral time of the multi-AF sensor.

10. The camera as claimed in claim 7, wherein when the determinator determines that each of signals outputted from the detection areas of the multi-AF sensor is in the state in which there is not the reflected light, the controller sets the amount of the main flash light emission made by the flash emitter to be a maximum amount.

11. The camera as claimed in claim 1, wherein the photographing lens is detachably attached to a body of the camera.

12. The camera as claimed in claim 1, wherein the flash emitter is connected to a body of the camera in which the flash emitter is integrally fixed in the body thereof.

13. The camera as claimed in claim 1, which is a single-lens reflex camera.

14. A method for controlling a flash photography, employed by a camera using a flash emitter for emitting a flash light towards an object to be photographed, having:
   a multi-AF sensor having a plurality of detection areas for receiving a reflected light, passing through a photographing lens, from the object, in which each of the detection areas outputs a signal;
   an AF controller for determining a detection area of the detection areas as a focus area on a basis of the signal outputted from the each of the detection areas of the multi-AF sensor; and
   the method comprising the steps of:
      making the flash emitter emit a preliminary flash light before making the flash emitter emit a main flash light;
      selecting a detection area of the detection areas as an optimum area which is most suitable for photographing the object, on a basis of the signal outputted from the each of the detection areas of the multi-AF sensor, in which the signal outputted from the each thereof corresponds to the reflected light from the object on a basis of emission of the preliminary flash light; and
      determining an amount of flash light emission made by the flash emitter at time of emission of the main flash light, on a basis of the signal outputted from the optimum area having been selected.

15. The method as claimed in claim 14, wherein the focus area determined by the AF controller, is selected as the optimum area.

16. The method as claimed in claim 14, wherein the detection area outputting the signal with a maximum value which is an effective value capable of determining the amount of the flash light emission made by the flash emitter at time of emission of the main flash light, is selected as the optimum area.

17. The method as claimed in claim 14, wherein the amount of the emission of the main flash light made by the flash emitter is determined on a basis of an average of values of signals, each of which is the signal, which are outputted from the detection areas outputting the signals with effective values capable of determining amounts of flash light emission made by the flash emitter at time of the emission of the main flash light.

18. The method as claimed in claim 14, wherein the amount of the emission of the main flash light made by the flash emitter is set to be a predetermined amount, when it is determined that each of signals outputted from the detection areas does not include an effective value.

* * * * *